VACUUM BRAKE CONTROL EQUIPMENT FOR MULTIPLE UNIT LOCOMOTIVES
Original Filed Feb. 12, 1963 5 Sheets-Sheet 1
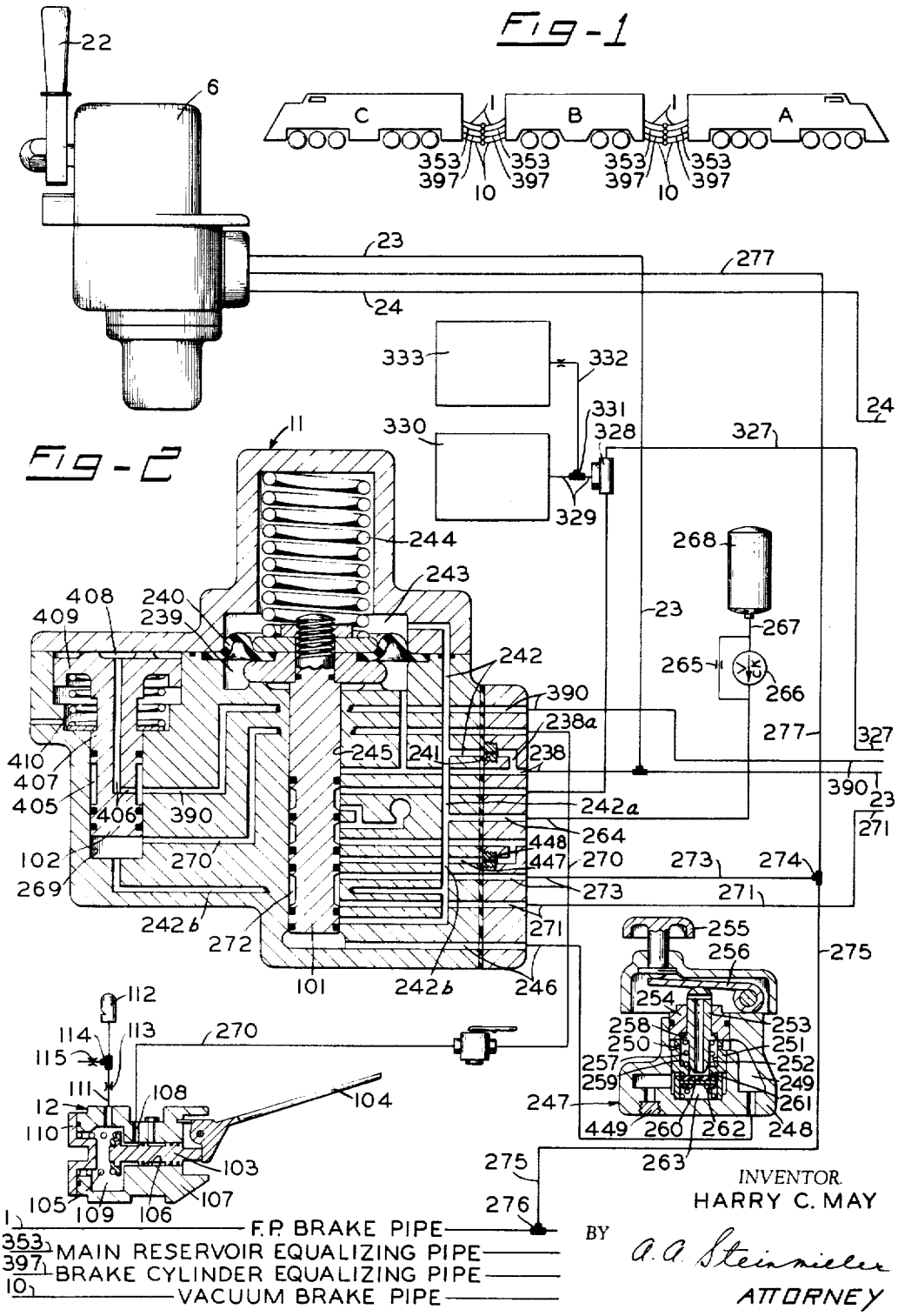
INVENTOR.
HARRY C. MAY
BY A. A. Steinmeier
ATTORNEY VACUUM BRAKE CONTROL EQUIPMENT FOR MULTIPLE UNIT LOCOMOTIVES
Original Filed Feb. 12, 1963 5 Sheets-Sheet 2
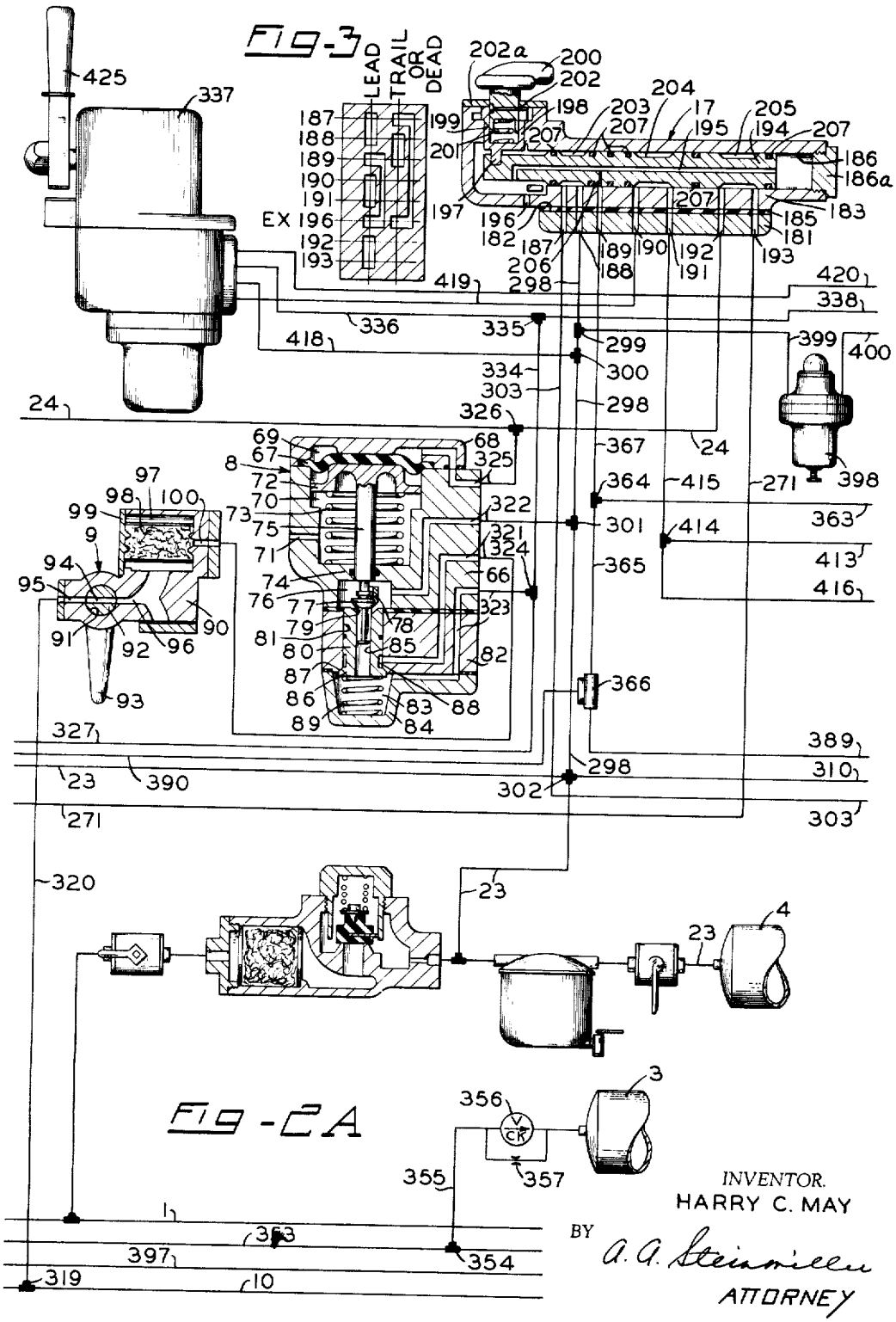
INVENTOR.
HARRY C. MAY
BY A. A. Steinmiller
ATTORNEY VACUUM BRAKE CONTROL EQUIPMENT FOR MULTIPLE UNIT LOCOMOTIVES
Original Filed Feb. 12, 1963 6 Sheets-Sheet 3
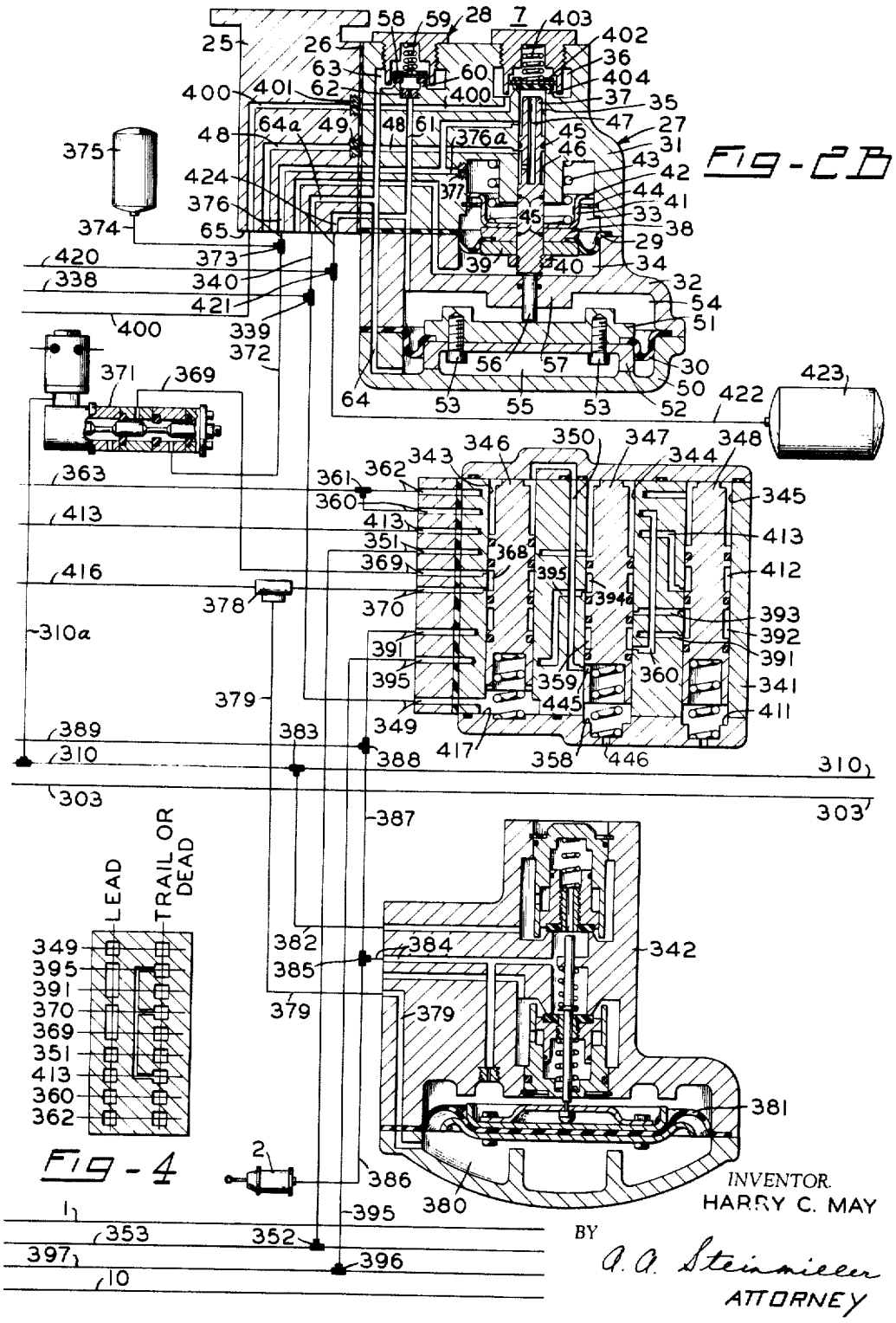
INVENTOR.
HARRY C. MAY
BY
A. A. Steinmeier
ATTORNEY

VACUUM BRAKE CONTROL EQUIPMENT FOR MULTIPLE UNIT LOCOMOTIVES

Original Filed Feb. 12, 1963 5 Sheets-Sheet 4

INVENTOR.
HARRY C. MAY
BY A. A. Steinmiller
ATTORNEY

VACUUM BRAKE CONTROL EQUIPMENT FOR MULTIPLE UNIT LOCOMOTIVES

Original Filed Feb. 12, 1963 5 Sheets-Sheet 5

INVENTOR
HARRY C. MAY

BY A. A. Steinmeier
ATTORNEY

United States Patent Office

Re. 26,022
Reissued May 10, 1966

26,022

VACUUM BRAKE CONTROL EQUIPMENT FOR MULTIPLE UNIT LOCOMOTIVES

Harry C. May, East McKeesport, Pa., assignor to Westinghouse Air Brake Company, Wilmerding, Pa., a corporation of Pennsylvania Original No. 3,206,257, dated Sept. 14, 1965, Ser. No. 258,038, Feb. 12, 1963. Application for reissue Dec. 21, 1965, Ser. No. 518,520
9 Claims. (Cl. 303—4)

Figure 2C:
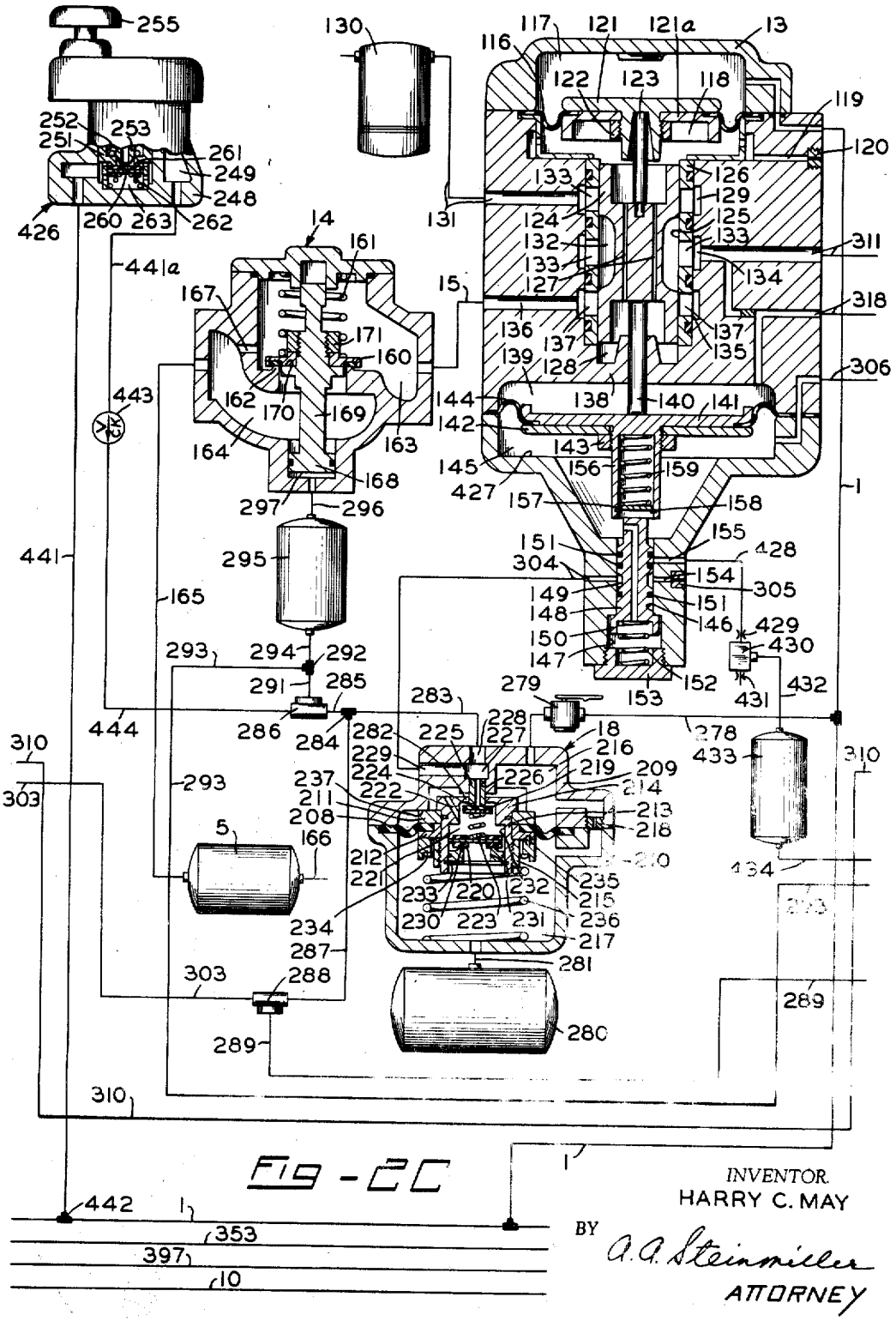

Matter enclosed in heavy brackets [ ] appears in the original patent but forms no part of this reissue specification; matter printed in italics indicates the additions made by reissue.

This invention relates to combined compressed air and vacuum operated brake equipment for multi-unit railway locomotives, and more particularly to a manually conditioned automatically operative multi-unit exhauster control apparatus by which the exhauster on the leading unit is under the manual control of the engineer and the exhausters on the trailing units are automatically controlled by the rate of increase in the pressure in a fluid pressure brake pipe extending through the several units of the multi-unit locomotive.

In apparatus of the above general type, it has heretofore been the practice to provide on each locomotive unit a cut-off valve device between a vacuum control valve device that controls a communication between a vacuum reservoir that is evacuated by an exhauster located on the respective locomotive unit and a vacuum brake pipe that extends through the train, which cut-off valve device on each trailing locomotive unit is manually placed in a cut-off position so that the vacuum brake pipe is evacuated by operation of only the exhauster located on the leading unit of the multi-unit locomotive. By thus using only the exhauster on the leading locomotive to effect evacuation of the entire vacuum brake pipe extending through the train, this single exhauster must operate at maximum capacity and, therefore, under a heavy load for a considerable period of time to effect a complete brake release on the entire train. Furthermore, should the exhauster on the leading unit fail or become inoperative, a shifting or rearrangement of the several locomotive units would be required in order that one of the former trailing units could be used as the leading unit and its exhauster operated to effect evacuation of the vacuum brake pipe. Therefore, it is apparent that the use of only the exhauster on the leading unit of a multi-unit locomotive to effect evacuation of the vacuum brake pipe extending through the train not only is time consuming and imposes a heavy load on the exhauster, but also requires a rearrangement of the several units should the exhauster on the leading unit become inoperative for any reason.

It is, therefore, the general object of this invention to control the availability of the exhausters on the trailing units of a multi-unit locomotive without the necessity of additional piping between the several locomotive units by providing a novel manually conditioned automatically operative multi-unit exhauster control apparatus to enable the engineer from the cab of the leading locomotive unit to effect automatic operation of the exhauster on each respective unit to assist in the evacuation of the vacuum brake pipe so long as the pressure in the fluid pressure brake pipe is increasing at a rate that is in excess of a chosen rate.

Fluid under pressure is supplied to the fluid pressure brake pipe under the control of the engineer by manual operation of an engineer's brake valve device located on the leading unit of a multi-unit locomotive and, so long as the rate of increase in the pressure in the fluid pressure brake pipe exceeds a chosen rate, the exhauster control apparatus on each trailing locomotive unit is operable thereby to cause the exhauster on each respective trailing locomotoive unit to be effective to assist the exhauster on the leading unit in evacuating a vacuum brake pipe extending through the train to release the train brakes.

The novel manually controlled automatically operative multi-unit exhauster control apparatus of this invention operates, while the pressure in the fluid pressure brake pipe extending from end to end of the multi-unit locomotive is increasing at a rate that is in excess of a chosen rate, to establish a communication between that portion of the vacuum brake pipe on each locomotive unit and the exhauster located on the respective unit whereby the exhauster on each unit is effective to assist the exhausters on the remaining units to evacuate the vacuum brake pipe to effect a brake release on the cars in the train.

Essentially, the invention comprises, for each unit of a multi-unit locomotive, a fluid pressure operated valve device for controlling a communication between the vacuum brake pipe and the respective exhauster that is selectively operated to open the communication accordingly as the respective locomotive unit is a leading or trailing unit by fluid under pressure supplied under the manual control of the engineer or by fluid under pressure supplied to the fluid pressure brake pipe on the respective trailing unit by manual operation by the engineer's brake valve device on the leading unit.

The release of the fluid under pressure supplied from the fluid pressure brake pipe to the fluid pressure operated valve device is under the control of a fluid pressure brake pipe operated valve device that is arranged in series with the first-mentioned fluid pressure operated valve device and so interlocked therewith as to provide for the release to atmosphere of this fluid under pressure only after the vacuum brake pipe has been evacuated to a chosen subatmospheric pressure.

In the accompanying drawings:

FIG. 1 is a diagrammatic view of a multi-unit locomotive.

Figure 2D:
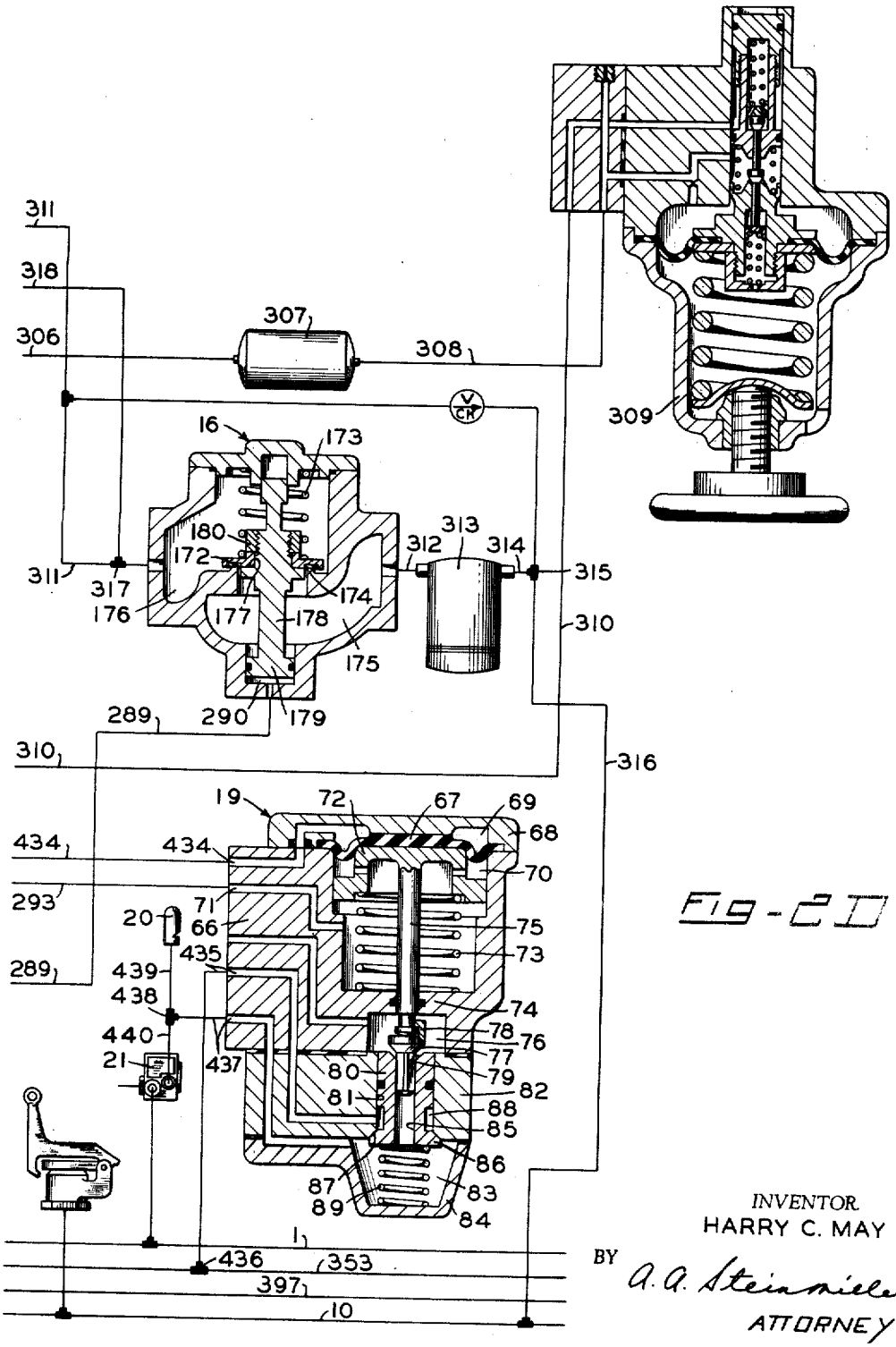

FIG. 2, FIG. 2A, FIG. 2B, FIG. 2C and FIG. 2D, when taken together such that the right-hand edge of FIG. 2 is matched with the left-hand edge of FIG. 2A, the right-hand edge of FIG. 2A is matched with the left-hand edge of FIG. 2B, the right-hand edge of FIG. 2B is matched with the left-hand edge of FIG. 2C, and the right-hand edge of FIG. 2C is matched with the left-hand edge of FIG. 2D, constitutes a diagrammatic view of a combined automatic compressed air and vacuum operated locomotive brake equipment for one unit of the multi-unit locomotive shown in FIG. 1 embodying the invention and comprising a novel exhauster control apparatus for controlling the operation of the respective exhauster on the one unit of a multi-unit locomotive.

FIG. 3 is a diagrammatic development view showing port connections established in lead and trail or dead positions of a change-over valve device shown in FIG. 2A, and FIG. 4 is a diagrammatic development view showing port connections established in lead and trail or dead positions of a selector vlave device shown in FIG. 2B.

DESCRIPTION

Referring to FIG. 1 of the drawings, the combined automatic compressed air and vacuum operated locomotive brake equipment described herein is applicable to a multi-unit locomotive illustratively shown as comprising a leading unit, hereinafter called unit A, and two trailing units, hereinafter called unit B and unit C. Each of the locomotive units A, B and C is provided with identical combined automatic compressed air and vacuum operated locomotive brake equipment as shown in FIGS. 2, 2A, 2B, 2C and 2D.

Referring to these drawings, the combined automatic compressed air and vacuum operated locomotive brake equipment for one unit of a multi-unit locomotive comprises a fluid pressure brake pipe 1 that extends from end to end of each unit of a multi-unit locomotive, a brake cylinder device 2, a first main reservoir 3, a second main reservoir 4, a vacuum reservoir 5, an engineer's automatic brake valve device 6 for controlling the pressure in the fluid pressure brake pipe 1, a brake control valve device 7 connected in series through a fluid pressure brake pipe operated cut-out valve device 8 and a combined cut-out cock and strainer device 9 to a vacuum brake pipe 10 that extends from the locomotive back through each car in a train, and controlled by variations in pressure in the vacuum brake pipe 10, a brake application valve device 11, a safety control or foot valve device 12, a vacuum control valve device 13 for normally controlling pressure in the vacuum brake pipe 10 according to variations in the pressure in the fluid pressure brake pipe 1, such that vacuum brakes on the connected cars of a train will be applied and released responsively to respective increases and decreases in pressure in the vacuum brake pipe 10 in the well-known manner, a quick release valve device 14 for controlling a large capacity flow communication between a vacuum source such as the vacuum reservoir 5 and a pipe 15 leading to the vacuum control valve device 13, a fluid pressure operated vacuum brake release valve device 16 for controlling a large capacity flow communication between the vacuum control valve device 13 and the vacuum brake pipe 10 to which valve device 16 fluid under pressure is supplied selectively accordingly as to whether the locomotive unit is respectively a leading or a trailing unit, by a manually operated change-over valve device 17 located in the cab of the locomotive or by a differential pilot valve device 18 automatically responsive to an increase in the pressure in fluid pressure brake pipe 1 at a rate in excess of a chosen rate, and a break-in-two protection valve device 19 operable in response to rupture of the vacuum brake pipe 10 to supply fluid under pressure to a whistle valve device 20 to sound an alarm and to a fluid pressure operated emergency relay valve device 21 of well-known construction to cause the operation thereof to effect a reduction at an emergency rate of the pressure in the fluid pressure brake pipe 1 connected thereto, which emergency rate of reduction effects an emergency application of both the locomotive and car brakes in a manner hereinafter described in detail.

The engineer's automatic brake valve device 6 is a self-lapping type of valve device having a self-lapping unit of any well-known construction which, while a brake valve handle 22 occupies a "Release" position, will be actuated to supply fluid under pressure from the second main reservoir 4, that is connected to the brake valve device 6 by a pipe 23, to a pipe 24 that is connected via the change-over valve device 17 and the brake application valve device 11 in a manner hereinafter explained in detail to the fluid pressure brake pipe 1 so that fluid under pressure is supplied to the fluid pressure brake pipe 1 at a pressure corresponding to a preselected normal charged value.

The handle 22 of the engineer's automatic brake valve device 6 has five positions, namely: "Release," "Minimum Reduction," "Full Service," "Over-Reduction" and "Emergency." Extending between the "Release" and "Full Service" positions is a service zone so that as the engineer moves the handle 22 arcuately from its "Release" position into the service zone an extent corresponding to the degree of service brake application desired, fluid under pressure will be exhausted from the fluid pressure brake pipe 1 proportional to the amount of arcuate movement of the handle 22 into this zone, thus providing a graduated application of the brakes on the locomotive.

A graduated release of the locomotive brakes can be effected by the engineer moving the handle 22 of the brake valve device 6 from whatever position it occupies in the service zone in the direction of its "Release" position to a selected position in the service zone corresponding to the higher degree of pressure desired in the fluid pressure brake pipe 1 and, therefore, to the reduction in pressure to be effected in the brake cylinder device 2.

A complete release of the locomotive brakes can be effected by the engineer moving the handle 22 of the brake valve device 6 from whatever position it occupies in the service zone in the direction of its "Release" position back to this position.

When the handle 22 is moved through an over-reduction zone extending between "Full Service" position and "Over-Reduction" position, an additional reduction in brake pipe pressure will be effected, which, for example, may be a total resultant reduction of pressure in the fluid pressure brake pipe 1 of approximately 36 to 38 pounds per square inch, upon the handle 22 reaching its "Over-Reduction" position.

In addition to a self-lapping unit, the engineer's automatic brake valve device 6 further comprises a vent valve device which is opened by the engineer moving the handle 22 to its "Emergency" position to effect a reduction in the pressure in the fluid pressure brake pipe 1 at an emergency rate to cause an emergency application of the locomotive and train brakes. A release of the locomotive and train brakes, subsequent to an emergency application, can be effected by the engineer moving the handle 22 from its "Emergency" position back to its "Release" position.

The brake control valve device 7 comprises a pipe bracket 25 having a face 26 on which is mounted a service valve device 27, the structure of which may be substantially the same as that of the service valve device 8 shown in FIG. 1B of United States Patent No. 3,018,138, issued January 23, 1962 to R. L. Wilson and William B. Jeffrey and assigned to the assignee of the present application, except for the addition of a check valve device 28, the purpose of which is hereinafter made apparent.

Briefly, the service valve device 27 preferably comprises two coaxially arranged movable abutments or diaphragms 29 and 30 of different effective areas cooperatively, though not positively, connected so as to constitute a stack, as will be understood from subsequent description. The outer periphery of the smaller diaphragm 29 is clamped between two casing sections 31 and 32 comprising a sectionalized casing of the service valve device 27. These casing sections are secured together by any suitable means (not shown).

The diaphragm 29 cooperates with the casing sections 31 and 32 to form within the service valve device 27 and on opposite sides of the diaphragm, a first pair of chambers 33 and 34, the latter being open to atmosphere.

The casing section 31 of the service valve device 27 is provided with a bore 35 which opens at one end into a chamber 36 adjacent the upper end of the casing section 31 and opens at the other end into the chamber 33. Slidably mounted in the bore 35 is a valve stem 37, the lower end of which extends through two diaphragm followers 38 and 39 disposed on opposite sides of the diaphragm 29 and is screw threaded to receive a nut 40 which has screw threaded engagement with the end of the valve stem 37 to operatively connect the center of the diaphragm 29 to the diaphragm followers 38 and 39 and to the valve stem 37. Resting against the upper side of the diaphragm follower 38 is a cup-shaped spring seat 41 having a peripheral annular flange 42. Disposed within the chamber 33 between the casing section 31 and the spring seat 41 and in surrounding relation to the valve stem 37 is a spring 43 for biasing the valve stem 37 and the diaphragm 29 in a downward direction. The spring 43 and spring seat 41 are retained in the chamber 33 by means of a snap ring 44 that is inserted in a groove formed in the casing section 31.

The valve stem 37 is provided with three identical spaced-apart peripheral annular grooves in each of which is disposed an O-ring seal 45 to prevent leakage of fluid under pressure between the periphery of the valve stem and the wall of bore 35, and between the chambers 33 and 34. The valve stem 37 is formed intermediate its ends with a peripheral annular groove 46 which, as shown in FIG 2B illustrating the relative positions of the parts of the service valve device 27 in the brake release position, is so located that the upper end of the bore 35 is open to atmosphere via a passageway 47 extending from the upper end of the valve stem 35 longitudinally therethrough to the location thereon at which the peripheral annular groove 46 is formed and thence crosswise the valve stem 37 so as to open into the groove 46, and thence via a passageway 48 extending through the casing section 31 and the pipe bracket 25, and a brake cylinder exhaust control choke 49 in the pipe bracket 25.

The outer periphery of the larger diaphragm 30 is clamped between the casing section 32 and a cover 50 which is secured to the casing section 32 by any suitable means (not shown). The center of the larger diaphragm 30 is clamped between two diaphragm followers 51 and 52 which are secured together by a plurality of cap screws 53 that pass through corresponding smooth bores in the diaphragm follower 52 and have screw threaded engagement with coaxial threaded bores in the diaphragm follower 51.

The larger diaphragm 30 cooperates with the casing section 32 and the cover 50 to form within the service valve device 27 and on opposite sides of the diaphragm 30, a second pair of chambers 54 and 55. A cylindrical pusher stem 56 arranged coaxially with the movable abutments 29 and 30 has sealing, slidably guided contact with the wall of an aligned bore through a casing partition 57 separating the chamber 54 from the chamber 34, the ends of the pusher stem 56 abuttingly contacting, respectively, the lower end of the valve stem 37 and the upper side of the diaphragm follower 51.

The hereinbefore-mentioned check valve device 28 comprises a flat disc-type valve 58 that is normally urged by a light biasing spring 59 into seated contact with an annular valve seat 60 formed adjacent one end of a passageway 61 in the casing section 31, the opposite end of which passageway 61 opens into the chamber 54 above the larger diaphragm 30. Disposed in the passageway 61 is a choke 62 to control the rate of one-way flow of fluid under pressure from the chamber 54, upon unseating of the flat disc check valve 58 from the annular valve seat 60, to an outlet chamber 63. The outlet chamber 63 is in constant communication with the chamber 55 below the large diaphragm 30 by way of a passageway 64 extending from the chamber 63 through the casing sections 31 and 32 and the cover 50. A branch passageway 64a extends through the casing section 31 and the pipe bracket 25 and opens at a flat face 65 formed on the lower side of the pipe bracket 25.

The fluid pressure brake pipe operated cut-out valve device 8 comprises a casing section 66 containing a diaphragm 67 clamped about its periphery between the casing section 66 and a cover 68 and defining with the cover a control chamber 69. At the other sde of the diaphragm 67 is a spring chamber 70 which is open to atmosphere through a passageway 71 in the casing section 66. Contained in chamber 70 is a diaphragm follower 72 which is held in operative contact with the diaphragm 67 by a spring 73 interposed between the follower 72 and a partition wall 74 of the chamber 70. Follower 72 has a stem 75 that extends through a central opening in the partition wall 74.

A chamber 76 is formed in the casing section 66 at the side of the partition wall 74 opposite the chamber 70 and contains a valve 77 that is linked by means of a forked connection 78 to the lower end of follower stem 75, as viewed in FIG 2A of the drawings. The valve 77 is adapted to make seating contact with a valve seat 79 formed on the upper end of a cylindrical valve member 80 which is slidably mounted in a bore 81 formed in a casing section 82 which is secured to the casing section 66 by any suitable means (not shown). The bore 81 in the casing section 82 extends from the chamber 76 to a chamber 83 formed in another casing section 84 secured to the casing section 82 by any suitable means (not shown).

The valve member 80 is provided with a through bore 85 encircled at its upper end by the valve seat 79 and at its lower end by a conical or poppet type valve 86 which valve is arranged for cooperation with a valve seat 87, formed on the casing section 82 at the lower end of bore 81, to control communication between chamber 83 and a chamber 88 defined by the wall of the bore 81 and a reduced portion of the valve member 80. A spring 89 disposed in chamber 83 constantly urges the valve member 80 upwardly to a position in which communication between chambers 76 and 83 is open via bore 85 and communication between chamber 83 and chamber 88 is closed, as shown in FIG. 2A of the drawings.

The combined cut-out cock and strainer device 9 comprises a body 90 having therein a bore 91 in which is rotatably mounted a cock key 92 that may be manually rotated by a handle 93 from an open position in which it is shown in FIG. 2A of the drawings to a closed or cut-off position in which a port 94 in the cock key 92 disestablishes communication between a first passageway 95 in the body 90 and a second passageway 96 also in the body 90 which passageway 96 opens at one end into a chamber 97 formed in the body 90. Contained in the chamber 97 is a strainer device 98 which is inserted through the left-hand open end of the chamber 97 and which is secured in place by means of a cover 99 closing the left-hand end of the chamber 97, the cover 99 being fastened to the body 90 by any suitable means (not shown). Such a strainer device is described and claimed in patent No. 2,014,895, issued September 17, 1935 to Ellis E. Hewitt, which patent is assigned to the assignee of the present application. Briefly, however, the strainer device 98 comprises two concentric perforated tubular retainers having the space therebetween packed with hair or any other material suitable for separating dirt, moisture or the like from a stream of fluid under pressure. The inner surface of the smaller of the two concentric retainers defines a passageway which is open to a third passageway 100 formed in the body 90.

The brake application valve device 11 may be substantially the same as that disclosed in United States Patent No. 2,958,561, issued November 1, 1960 to Harry C. May and assigned to the assignee of the present application, and in view of this it is deemed unnecessary to describe this device in detail. Briefly, however, the brake application valve device 11 comprises a sectionalized casing containing an application valve 101 and a suppression valve 102.

The safety control valve device 12 is preferably of the foot valve type comprising a spool-type valve 103 controlled by a pedal 104 that is spring-biased by a spring 105 acting through the intermediary of spool-type valve 103 to a first or elevated position in which it is shown in FIG. 2 of the drawings in which the spool-type valve 103 is so disposed in a bore 106 formed in a casing section 107 that a communication is established between a passageway 108 formed in the casing section 107 and opening at one end at the wall surface of the bore 106 intermediate the ends thereof and a chamber 109 formed by the cooperative relation of the casing section 107 and a cover 110 secured by any suitable means (not shown) to the casing section 107 and into which chamber 109 the left-hand end of the bore 106 opens. The chamber 109 is connected by a passageway and pipe 111 to a whistle 112 of any well-known construction. Disposed in the pipe 111 is a restriction or choke 113 and a pipe T 114, the side outlet of which is open to atmosphere through a second choke 115 having a capacity slightly in excess of the capacity of the first choke 113.

The vacuum control valve device 13 (FIG. 2C) is provided for the purpose of varying the pressure in the vacuum train pipe 10 in accordance with the variations in pressure in fluid pressure brake pipe 1 to thereby control the vacuum brakes on the cars of a train in accordance with the operation of the fluid pressure brake valve device 6 to control the fluid pressure brakes on the locomotive. The vacuum control valve device 113 comprises a diaphragm 116 clamped about its periphery between two sections of a casing and defining therewith a control chamber 117 at one side, which chamber is connected to brake pipe 1, and at the other side a chamber 118 which is open to atmosphere through a vent port 119 having therein a choke 120. Contained in chamber 117 is a diaphragm follower 121 which extends through a suitable central opening in diaphragm 116 and is clamped to said diaphragm by means of a diaphragm plate 121a and a nut 122 contained in chamber 118. A stem 123 has its upper end disposed within a tapered bore in a boss formed integrally with the lower side of diaphragm follower 121. The stem 123 extends through the chamber 118 and has a rigid connection with a cylindrically-shaped slide valve 124 slidably mounted in a suitable bore 125 formed in a bushing 126 that is press-fitted in the casing. A pair of parallel spaced-apart longitudinal passageways 127 formed in the valve 124 connects chamber 118 with a chamber 128 formed in the casing at the opposite end of said valve from chamber 118.

Formed in the casing about the upper end of slide valve 124 is an annular chamber 129 which is connected to an atmospheric intake filter 130 through a passageway 131 and a correspondingly numbered pipe. The passageway 131 and annular chamber 129 may be, at certain times, as hereinafter described in detail, connected through a cavity 132 in cylindrical slide valve 124 and two sets of longitudinally spaced-apart arculately arranged ports 133 formed in the bushing 126 to a similar annular chamber 134 formed in the casing. Also formed in the casing and spaced apart below the annular chamber 134 is a third annular chamber 135 which is always connected by a passageway 136 formed in the casing and the pipe 15 which is connected at one end to the passageway 136, to the quick release valve device 14. The passageway 136 and annular chamber 135 may be, at certain times, other than the above-mentioned certain times, as hereinafter described in detail, connected through a third set of arcuately arranged ports 137 formed in the bushing 126, the cavity 132 in the cylindrical slide valve 124, and the lower set of ports 133 in the bushing, to the annular chamber 134.

Slidably mounted in a suitable opening in a partition wall 138 between chamber 128 and a chamber 139 is a stem 140 which is arranged to make abutting connection between the slide valve 124 and a diaphragm follower 141 contained in the chamber 139.

The diaphragm follower 141 is secured by means of an annular plate 142 and a nut 143 to the center of a diaphragm 144 clamped at its periphery between two sections of the casing so as to define, in part, the chamber 139 at one side and a chamber 145 at the other side.

The lower of the two sections of the casing which clamp the periphery of the diaphragm 144 therebetween is provided with a bore 146 that opens at its upper end into the chamber 145 and at its lower end into a counterbore 147 coaxial therewith, the lower end of which counterbore is provided with screw threads. Slidably mounted in the bore 146 is a hollow spool-type valve 148 having intermediate its ends a peripheral annular groove 149 and at its lower end a collar 150.

An O-ring seal 151 is carried by the spool-type valve 148 in each of three spaced-apart peripheral annular grooves along the length of the spool-type valve so that, while it is biased to the position in which it is shown in FIG. 2C of the drawings by a spring 152 interposed between collar 150 and a plug 153 screw threaded into the lower threaded end of counterbore 147, the lower and intermediate O-ring seals 151, which are disposed adjacent the opposite ends of the peripheral annular groove 149, as disposed respectively below and above the location at which one end of a passageway 154 in the lower casing section opens at the wall surface of the bore 146 to prevent leakage respectively from the peripheral annular groove 149 along the periphery of the spool-type valve 148 to the interior of the counterbore 147 and from the chamber 145 into which opens the upper end of the bore 146 to the passageway 154 that is open at its other end to atmosphere. Also, while the spool-type valve 148 is biased by the spring 152 to the position in which it is shown in FIG. 2C, the upper and intermediate O-ring seals 151 are disposed respectively above and below the location at which one end of a passageway 155 in the lower casing section opens at the wall surface of the bore 146 to respectively prevent leakage from the chamber 145 along the periphery of the spool-type valve 148 to the passageway 155 and from the passageway 155 to peripheral annular groove 149.

In order to effect downward movement of the spool-type valve 148 from the position in which it is shown in FIG. 2C to another position in which a communication is established between the chamber 145 and the passageway 155, the diaphragm follower 141 has formed integral therewith a hollow stem 156 that extends through the annular plate 142 and into the chamber 145 and is coaxial with the spool-type valve 148. Disposed within the hollow stem 156 and interposed between the upper end thereof and a spring seat 157 retained in the lower end thereof by a snap ring 158 that is inserted in a groove formed in the interior wall surface of the hollow stem 156 is a spring 159. The spring 159 and spring seat 157 provide for additional downward deflection of the diaphragm 144 subsequent to the collar 150 on the lower end of the spool-type valve 148 contacting the plug 153, this additional downward deflection occurring, as hereinafter explained in detail, in response to a break-in-two of the vacuum brake pipe 10 which is effective to admit atmospheric air into the chamber 139 above the diaphragm 144 until the pressure in chamber 139 increases to atmospheric pressure.

The quick release valve device 14 may be substantially the same as that disclosed in United States Patent No. 2,822,220, issued February 4, 1958 to Harry C. May and assigned to the assignee of the present application, and in view of this it is deemed unnecessary to describe this device in detail. Briefly, however, the quick release valve device 14 comprises a disc-shaped valve 160 normally biased by a spring 161 into contact with an annular valve seat 162 for preventing large capacity flow between a chamber 163 to which one end of the pipe 15 is connected and a chamber 164 that is connected via a pipe 165 to the vacuum reservoir 5, which reservoir is connected via a pipe 166 to a vacuum exhauster (not shown). A choke 167 permits limited flow between the chambers 163 and 164 in by-pass of the disc-shaped valve 160 for permitting vacuum in the vacuum brake pipe 10 to be maintained against normal leakage, as will hereinafter be explained in detail, while the disc-shaped valve 160 is seated. The disc-shaped valve 160 is adapted to be moved out of sealing contact with the annular valve seat 162 by a coaxially arranged piston 168 having a piston rod 169 that extends through the annular valve seat 162 and has a shoulder 170 thereon against which the disc-shaped valve 160 is clamped by a nut 171 having screw threaded engagement with screw threads formed on the piston rod 169 intermediate the ends thereof.

The fluid pressure operated vacuum brake release valve device 16 (FIG. 2D) is similar in construction to the quick release valve device 14 and comprises a disc-shaped valve 172 normally biased by a spring 173 into contact with an annular valve seat 174 to close communication between two chambers 175 and 176 within the vacuum brake release valve device 16. The disc-shaped valve 172 is secured against a shoulder 177 formed on a piston rod 178 of a piston 179 by a nut 180.

The manually operated change-over valve device 17 (FIG. 2A), which is located in the cab of the locomotive so that the engineer has easy access thereto, comprises a pipe bracket 181 that is provided on its upper side with a flat face 182 to which is secured by any suitable means (not shown) a body 183 having on its lower side a flat face 184 between which and the flat face 182 is disposed a gasket 185.

Extending from the lower side of the pipe bracket 181 through the pipe bracket, the gasket 185 and the body 183, and opening at the wall surface of a bore 186 in the body 183, the right-hand end of which is closed by a plug 186a, are seven passageways 187, 188, 189, 190, 191, 192 and 193 which passageways are connected by pipes, as hereinafter described in detail, to various devices that comprise the brake equipment on one unit of a multi-unit locomotive.

The manually operated change-over valve device 17 further comprises a spool-type selector valve 194 that is sealingly slidable in the bore 186 in the body 183 and exposed at both ends to atmospheric pressure via a longitudinal atmospheric passageway 195 in the spool-type selector valve 194 and a port 196 in the body 183 near the left-hand end of the bore 186. The spool-type selector valve 194 has adjacent its left-hand end a transversely extending notch into which extends a dog 197 that is eccentrically carried by a rotatable member 198 that is rotatably mounted in a bore 199 in the body 183. The spool-type selector valve 194 can be shifted axially in the bore 186 to either one of two positions, hereinafter defined, by rotation of the rotatable member 198 by means of a handle 200 which must be first pushed downward against the force of a bias spring 201 to disengage or unlock a pin 202 from a position-defining notch formed on the bottom side of a cover member 202a that closes the upper end of the bore 199 in the body 183. The bottom side of the cover 202a is provided with a second position-defining notch into which the pin 202 is biased by the spring 201 upon release of the handle 200 subsequent to rotation thereof to effect shifting of the spool-type selector valve 194 from one of its two positions to the other.

Intermediate its ends the spool-type selector valve 194 has three axially spaced-apart peripheral annular grooves 203, 204 and 205 and a restricted radial port 206 that extends from the central passageway 195 in the spool-type selector valve 194 to the periphery thereof and, while the selector valve 194 occupies the position in which it is shown in FIG. 2A, registers with the passageway 189 that extends through the body 183 and pipe bracket 181. The peripheral annular grooves 203, 204 and 205 and the restricted radial port 206 are sealingly separated one from another by a plurality of O-ring seals 207 each carried in one of a plurality of spaced-apart peripheral annular grooves provided in the spool-type selector valve 194. While the spool-type selector valve 194 occupies the position in which it is shown in FIG. 2A, the peripheral annular groove 203 thereon connects the passageways 187 and 188, the restricted radial port 206 connects the passageway 189 to atmosphere via central passageway 195 and port 196, the peripheral annular groove 204 connects the passageways 190 and 191, and the peripheral annular groove 205 connects the passageways 192 and 193.

The differential pilot valve device 18 (FIG. 2C) may be substantially the same as that disclosed in United States Patent No. 2,822,220, issued February 4, 1958 to Harry C. May and assigned to the assignee of the present application, and in view of this it is deemed unnecessary to describe this device in detail. Briefly, however, the differential pilot valve device 18 comprises an annular flexible diaphragm 208 clamped about its outer edge between two casing sections 209 and 210 of a sectionalized casing and about its inner edge between two follower plates 211 and 212 that are clamped together by means of a hollow check valve housing 213 having at its upper end a collar 214 that abuts the upper side of the follower plate 211, and a nut 215 that has screw threaded engagement with corresponding screw threads formed on the lower end of the hollow check valve housing. The diaphragm 208 cooperates with the casing sections 209 and 210 to form within the differential pilot valve device 18 and on opposite sides of the diaphragm, two chambers 216 and 217 constantly connected via a choke 218.

Disposed in the hollow check valve housing 213 are two coaxially arranged disc-shaped check valves 219 and 220 between which is a chamber 221 constantly open to the chamber 216 via a passageway 222 in the housing. A bias spring 223 is disposed in the chamber 221 and interposed between the disc-shaped check valves 219 and 220. Spring 223 is effective to normally bias the check valve 219 into seating contact with a coaxially arranged tapered annular valve seat 224 formed on the lower end of a bushing 225 that extends through the collar 214 and is press-fitted into a bore 226 in the casing section 209. The upper end of the bushing opens into a chamber 227 formed in the casing section 209 from which chamber two passageways 228 and 229 open to the exterior of this casing section.

The spring 223 is also effective to bias the check valve 220 into seating contact with a coaxially arranged annular valve seat 230 formed on the upper end of an annular seat member 231 that is retained in a counterbore 232 in the check valve housing 213 by a snap ring 233 that is inserted in a groove formed in the counterbore 232.

A spring seat 234 is secured to the lower side of the follower plate 212 by means such as a dowel pin 235, and interposed between the spring seat 234 and the bottom wall of the chamber 217 is a spring 236 which is effective, while the pressures in the chambers 216 and 217 are substantially equal, to bias the diaphragm 208 and its follower assemblage to a normal position, in which they are shown in FIG. 2C of the drawings, in which the follower plate 211 contacts a stop 237 formed on the casing section 209. With the diaphragm 208 in this position, spring 223 is effective to respectively bias check valve 219 into contact with its annular valve seat 224 and check valve 220 into contact with its annular valve seat 230.

The break-in-two protection valve device 19 (FIG. 2D) is identical in construction to the hereinbefore-described fluid pressure brake pipe operated cut-out valve device 8. Therefore, for convenience, corresponding parts of the two valve devices are identified by the same reference numerals without additional description.

The whistle valve device 20 may be of any well-known construction which, for example, may comprise a pipe or tube having a narrow aperture through which fluid under pressure is forced.

As hereinbefore stated, the emergency relay valve device 21 is of well-known construction and, briefly, comprises a body in which is mounted a fluid pressure operated piston having a stem secured thereto which carries at the end thereof opposite the piston a vent valve secured to the stem by a nut. The vent valve is normally seated on an annular valve seat by a biasing spring to close communication between a first chamber on the spring side of the vent valve to which is connected a branch of the fluid pressure brake pipe 1 and a second chamber that is open to atmosphere.

OPERATION

Assume initially that the brake equipment shown in FIGS. 2, 2A, 2B, 2C and 2D is the equipment on the leading unit A of the multi-unit locomotive shown in FIG. 1; that the apparatus is void of fluid under pressure; that handle 22 of the automatic brake valve device 6 (FIG.

2) is in "Release" position, and that the self-lapping unit of the brake valve device 6 has been adjusted to provide via pipe 24 a desired (such as seventy pounds per square inch) normal charged value in the fluid pressure brake pipe 1, that the spool-type selector valve 194 of manual change-over valve device 17 is in the position in which it is shown in FIG. 2A of the drawings in which position it conditions the brake equipment shown in FIGS. 2, 2A, 2B, 2C and 2D for lead unit operation, as will hereinafter be described in detail; that the application valve 101 and the suppression valve 102 of the brake application valve device 11 are in their normal position, as shown in FIG. 2; that the pedal 104 of the foot valve device 12 is spring-biased to an elevated position; and that the handle 93 of the combined cut-out cock and strainer device 9 is in the position in which it is shown in FIG. 2A, in which position the cock key 92 that is operated by the handle 93 is also in the position in which it is shown so that the port 94 in the cock key 92 establishes a communication between the passageways 95 and 96 in the body 90 of the combined cut-out cock and strainer device 9. Under these conditions, the various components of the apparatus will be in the respective positions in which they are shown in FIGS. 2, 2A, 2B, 2C and 2D of the drawings.

INITIAL CHARGING-LEADING LOCOMOTIVE UNIT

To initially charge the apparatus, the diesel engines are started for operating fluid compressors (not shown) to effect charging of the first main reservoir 3 and the second main reservoir 4 and for operating an exhauster (not shown) to effect evacuation of fluid under pressure from the vacuum reservoir 5. Pedal 104 of the foot valve device 12 must be depressed by the engineer to effect movement of the spool-type valve 103 in the direction of the left hand from the position in which it is shown in FIG. 2 to a position in which communication is closed between the passageway 108 and the chamber 109 to prevent a safety control brake application in the manner hereinafter described. With the passageway 108 thus cut off from the chamber 109, the brake apparatus will be charged in the following manner:

Fluid under pressure will be supplied from the second main reservoir 4 via pipe 23 and a pipe and passageway 238 to a chamber 239 at the lower side of a diaphragm 240 that is operatively connected to the application valve 101 of the brake application valve device 11 at a substantially unrestricted rate and will also be supplied via a branch passageway 238a, a choke 241, and a passageway 242 to a chamber 243 at the upper side of the diaphragm 240 at a restricted rate controlled by the choke 241. However, the choke 241 is of such flow capacity that despite the more rapid charging of the chamber 239, application valve 101 will remain in its normal position, in which it is shown, during initial charging because the pressure in chamber 239 will not exceed the pressure in chamber 243 by an amount sufficient to overcome the heavy bias of a spring 244 disposed in the chamber 243 subjecting the upper side of the diaphragm 240 to the force thereof and because the lower end of a bore 245 in which the application valve 101 is slidably mounted will now be vented via a passageway and pipe 246 and a manually operated on-off valve device 247 which will now be described.

Briefly, the manually operated on-off valve device 247 comprises a body 248 having therein a chamber 249 into which one end of the pipe 246 opens. The chamber 249 is normally open to atmosphere through a plurality of radial ports 250 that open from the periphery of a bushing 251 press-fitted into a bore in the body 248 into a counterbore 252 in the bushing 251 and a hollow plunger 253 that is slidably mounted in a bore in a second bushing 254 coaxial with the bushing 251 and press-fitted in a bore in the body 248.

The chamber 249 can be cut off from atmosphere by manually depressing a push button 255 to effect counterclockwise rocking of a pivoted lever 256 against which the upper end of the hollow plunger 253 is biased by a spring 257 that surrounds the hollow plunger 253 and is interposed between a collar 258 formed on the hollow plunger 253 and a shoulder 259 formed by the bottom of the counterbore 252. As the lever 256 is thus rocked counterclockwise, the hollow plunger 253 is moved downward against the bias of the spring 257 until the lower end of the hollow plunger contacts a rubber-covered flat disc valve 260 that is normally biased into contact with an annular valve seat 261 formed on the lower end of the bushing 251 by a spring 262 that is interposed between the flat disc valve 260 and the bottom of a chamber 263 formed in the body 248. Further downward movement of the hollow plunger 253 effects unseating of the flat disc valve 260 against the yielding resistance of the spring 262 from the annular valve seat 261 to establish communication between chambers 249 and 263, but by reason of the fact that the lower end of the hollow plunger 253 now is in contact with the upper side of the rubber-covered flat disc valve 260, fluid under pressure cannot escape from the chamber 263 to atmosphere.

The fluid under pressure supplied to the passageway 242, as hereinbefore explained, will, in addition to flowing to the chamber 243, also flow via a branch passageway 242a, a passageway and pipe 264, and at a restricted rate controlled by a choke 265 having a check valve device 266 arranged in parallel therewith, a pipe 267 to a timing volume reservoir 268 for charging the latter. Choke 265 is provided so as not to delay effective build-up of pressure in chamber 243. However, the check valve device 266, which is arranged in parallel with choke 265, provides for substantially unrestricted flow from timing volume reservoir 268 to pipe 264 in bypass of choke 265 under conditions hereinafter described.

The fluid under pressure supplied from the second main reservoir 4 through the choke 241 and the passageway 242 to the branch passageway 242a also flows therefrom via a branch passageway 242b, and a counterbore 269 in which the suppression valve 102 of the brake application valve device 11 is slidably mounted while the suppression valve 102 occupies the position shown in FIG. 2, to a passageway and pipe 270, which pipe is connected to the passageway 108 in the casing section 107 of the foot valve device 12, the pedal 104 of which is now held depressed by the engineer to prevent flow to atmosphere via chamber 109, pipe 111 and whistle 112.

As has been assumed, the handle 22 of the engineer's automatic brake valve device 6 is in its "Release" position. Therefore, while the handle 22 is in its "Release" position, the self-lapping unit of the engineer's automatic brake valve device 6 will be actuated to supply fluid under pressure from the pipe 23, which is connected to the second main reservoir 4, to the pipe 24 which is connected to the passageway 192 that extends through the pipe bracket 181 and body 183 of the change-over valve device 17 and opens at the wall surface of the bore 186 in the body 183. Since it has been assumed that the spool-type selector valve 194 is in the position in which it is shown in FIG. 2A, the peripheral annular groove 205 thereon establishes a communication between the passageways 192 and 193. Therefore, the fluid under pressure supplied to the pipe 24 by the self-lapping unit of the engineer's automatic brake valve device 6 will flow therefrom via passageway 192, peripheral annular groove 205 and passageway 192 to a pipe 271 connected at one end to the passageway 193 and at the opposite end to a passageway bearing the same numeral in the brake application valve device 11 and opening at the wall surface of the bore 245. While the application valve 101 occupies the position in which it is shown in FIG. 2, a peripheral annular groove 272 thereon establishes a communication between the passageway and pipe 271 and a passageway and pipe 273, which pipe is connected to the side outlet of a pipe T 274. One outlet of the pipe T 274 is connected by a pipe 275 to the side outlet of a pipe T 276 that is disposed in the fluid pressure brake pipe 1. The other outlet of the pipe T 274 is connected by a pipe 277 to the hereinbefore-mentioned vent valve device of the engineer's automatic brake valve device 6.

The fluid under pressure supplied via the pipe 275 to the fluid pressure brake pipe 1 from the self-lapping unit of the engineer's automatic brake valve device 6 will therefore charge the fluid pressure brake pipe 1 to a pressure corresponding to the hereinbefore-mentioned preselected normal charged value.

As fluid under pressure is supplied to the fluid pressure brake pipe 1 in the manner just explained to increase the pressure therein from atmospheric pressure to the hereinbefore-mentioned preselected normal value, which, for example, may be seventy pounds per square inch, the chamber 216 is the differential pilot valve device 18, which is connected to the fluid pressure brake pipe 1 by a pipe 278 having therein a manually operated cut-out valve device 279 that may be assumed to be in its open position, and the chamber 117 in the vacuum control valve device 13 are simultaneously supplied with fluid under pressure so that the pressure in these chambers increases at the same rate as the pressure in the fluid pressure brake pipe 1 increases.

The fluid under pressure thus being supplied to the chamber 216 above the diaphragm 208 of the differential pilot valve device 18 cannot flow therefrom via the choke 218 to the chamber 217 below this diaphragm and a volume reservoir 280 connected thereto by a pipe 281 due to the restricted rate of flow provided by the choke as fast as it is flowing to the chamber 216 from the fluid pressure brake pipe 1. Consequently, the pressure in the chamber 216 will increase faster than the pressure in the chamber 217 and establish a differential fluid pressure force for causing the diaphragm 208 and its follower assemblage to shift downward against the yielding resistance of spring 236 for operatively unseating check valve 219 from annular valve seat 224 through the medium of an overlying flange 282 formed on the collar 214. Upon the unseating of check valve 219 from annular valve seat 224, fluid under pressure from the fluid pressure brake pipe 1 that is present in the chamber 216 will flow therefrom through the bushing 225 to the chamber 227 and the passageways 228 and 229 in the casing section 209.

The passageway 228 is connected by a pipe 283 to one end of a pipe T 284. The opposite end of the pipe T 284 is connected by a pipe 285 to one end of a first double check valve device 286, and the side outlet of pipe T 284 is connected by a pipe 287 to one end of a second double check valve device 288, the side outlet of which is connected by a pipe 289 to a chamber 290 formed in the casing of the vacuum brake release valve device 16 (FIG. 2D) below the piston 179 therein. The side outlet of the above-mentioned first double check valve device 286 is connected by a pipe 291 to one end of a pipe T 292. The side outlet of the pipe T 292 is connected by a pipe 293 to the passageway 71 in the casing section 66 of the hereinbefore-mentioned break-in-two protection valve device 19, and the other end of the pipe T 292 is connected by a pipe 294 to a timing volume reservoir 295 which, in turn, is connected by a pipe 296 to a chamber 297 formed in the casing of the quick release valve device 14.

Since it has been assumed that the spool-type selector valve 194 of the manual change-over valve device 17 is in the position in which it is shown in FIG. 2A to condition the brake equipment for lead unit operation, the peripheral annular groove 203 thereon establishes a communication between the passageways 187 and 188 that extend through the body 183 and the pipe bracket 181. The passageway 188 is connected by a pipe 298 having disposed in series therein three pipe T's 299, 300 and 301 to one outlet of a pipe cross 302 that is disposed in the pipe 23 that is connected to the second main reservoir 4 as hereinbefore mentioned. The passageway 187 is connected by a pipe 303 to the other end of the hereinbefore-mentioned double check valve device 288. Therefore, as the second main reservoir 4 is charged by operation of the fluid compressors, fluid under pressure will flow therefrom via pipe 23, pipe cross 302, pipe 298, passageway 188, peripheral annular groove 203 on the spool-type valve 194 of the change-over valve device 17, passageway 187, and pipe 303 to the left-hand end of the double check valve 288 and position the double check valve therein to establish a communication between the pipe 303 and the pipe 289, it being understood that the rate of build-up of pressure in the second main reservoir 4 and therefore in the pipe 303 which is supplied with fluid under pressure therefrom, as just explained, is more rapid than the build-up of pressure in the fluid pressure brake pipe 1 via the engineer's brake valve device 6 and the pipe 287 which is supplied with fluid under pressure from the fluid pressure brake pipe 1 via the differential pilot valve device 18. The fluid under pressure thus supplied from the second main reservoir 4 to the pipe 289 will flow to the chamber 290 below the piston 179 and move this piston and piston rod 178 upward against the yielding resistance of the spring 173 to unseat the disc-shaped valve 172 from the annular valve seat 174 to establish a communication between the chambers 175 and 176 in the vacuum brake release valve device 16.

The fluid under pressure supplied from the fluid pressure brake pipe 1 to the pipe 283 by operation of the differential pilot valve device 18 will flow therefrom via pipe T 284, pipe 285, double check valve device 286, pipe 291, pipe T 292, pipe 294, timing volume reservoir 295 and pipe 296 to the chamber 297 below the piston 168 of the quick release valve device 14, and simultaneously via the pipe 293 to the chamber 70 in the break-in-two protection valve device 19 so that the pressure in the timing volume reservoir 295 and the chambers 297 and 70 increases at the same rate. Therefore, when the pressure in the chamber 297 has increased to a value sufficient to overcome the biasing force of the spring 161, the piston 168 and piston rod 169 will be moved upward against the yielding resistance of the spring 161 to effect unseating of the disc-shaped valve 160 from the annular valve seat 162 and thereby establish a communication between the chambers 163 and 164 in the quick release valve device 14.

Fluid under pressure supplied to the chamber 227 in the differential pilot valve device 18, as hereinbefore explained, in addition to flowing therefrom to the pipe 283, also flows to a pipe 304 connected at one end to the passageway 229 in the casing section 209 of the differential pilot valve device 18 and at its opposite end to a passageway bearing the same numeral that opens at the wall surface of the bore 146 in the lower casing section of the casing of the vacuum control valve device 13 diametrically opposite the location at which the passageway 154 opens into this bore. Therefore, while the hollow spool-type valve 148 occupies the position in which it is shown in FIG. 2C, the fluid under pressure supplied to the pipe and passageway 304 will flow therefrom to atmosphere via the peripheral annular groove 149, the passageway 154 and a choke 305 disposed in this passageway. However, at the same time that fluid under pressure is flowing from the fluid pressure brake pipe 1 to the chamber 216 of the differential pilot valve device 18 to effect operation of this device to supply fluid under pressure to the pipe 304 and thence via the choke 305 to atmosphere, fluid under pressure is also flowing from the fluid pressure brake pipe 1 to the chamber 117 of the vacuum control valve device 13 to operate this valve device in a manner now to be described to move the spool-type valve 148 downward from the position in which it is shown in FIG.

2C to a position in which the peripheral annular groove 149 no longer establishes a communication between the passageways 304 and 154 thereby cutting off the flow of fluid under pressure from the pipe 304 to atmosphere via passageway 154 and choke 305.

The chamber 145 of the vacuum control valve device 13 is connected by a pipe 306 to a volume reservoir 307 that, in turn, is connected by a pipe 308 to the outlet connection of a self-lapping automatic pressure reducing valve device 309. The reducing valve device 309 may be of any suitable type that can be manually adjusted to supply fluid under pressure from the second main reservoir 4 to which the supply connection of reducing valve device 309 is connected via a pipe 310 connected to one outlet of the pipe cross 302 and the pipe 23 connecting another outlet of this pipe cross to the reservoir 4, to the outlet connection thereof and thence via pipe 308 to the volume reservoir 307 to maintain therein, and in the chamber 145 connected to the volume reservoir 307 by the pipe 306, any desired preselected pressure which, for example, may be twenty-five pounds per square inch.

Fluid under pressure supplied by the engineer's brake valve device 6 to the fluid pressure brake pipe 1 flows therefrom to the control chamber 117 of the vacuum control valve device 13 and when the pressure in this chamber has reached a value such that this pressure acting over the effective area of the diaphragm 116 establishes a force acting in a downward direction that is in excess of the force established by the fluid under pressure present in the chamber 145 and acting in an upward direction over the effective area of the diaphragm 144, the diaphragms 116 and 144 will be deflected downward against the constant reference pressure in the chamber 145 and the volume reservoir 307 to shift, through the medium of the stem 123, the cylindrical slide valve 124 downward to a release position in which the annular chamber 135 is connected via the plurality of ports 137 in bushing 126, the cavity 132 in the cylindrical slide valve 124 and the plurality of ports 133 also in bushing 126 to the annular chamber 134.

The annular chamber 134 is connected by a passageway and corresponding pipe 311 to the chamber 176 in the vacuum brake release valve device 16, and the annular chamber 135 is connected by the passageway 136 and pipe 15 to the chamber 163 in the quick release valve device 14. Furthermore, as hereinbefore explained in detail, the disc-shaped valve 160 in the quick release valve device 14 is now unseated from its corresponding annular valve seat 162, and the disc-shaped valve 172 in the vacuum brake release valve device 16 is also unseated from its corresponding annular valve seat 174. Consequently, the vacuum reservoir 5 is now connected to the vacuum brake pipe 10 via pipe 165, chambers 164 and 163 in the quick release valve device 14, pipe 15, passageway 136, annular chamber 135, ports 137, cavity 132 in cylindrical slide valve 124, ports 133, annular chamber 134, passageway and pipe 311, chambers 176 and 175 in the vacuum brake release valve device 16, a pipe 312 that connects the chamber 175 to the outlet of an air filter device 313, a pipe 314 that connects the inlet of the air filter device 313 to the side outlet of a pipe T 315, and a pipe 316 that connects one end of the pipe T 315 to the vacuum brake pipe 10. Since the exhauster that is connected via the pipe 166 to the vacuum reservoir 5 is now operating as hereinbefore stated, it will be effective to evacuate fluid under pressure from the vacuum reservoir 5 and the vacuum brake pipe 10 simultaneously as fluid under pressure is supplied by the self-lapping unit of the engineer's brake valve device 6 to the fluid pressure brake pipe 1 to effect the charging thereof up to the hereinbefore-mentioned desired normal charged value which, as previously stated, may be, for example, seventy pounds per square inch.

Disposed in the pipe 311 is a pipe T 317, the side outlet of which is connected by a pipe and passageway 318 to the chamber 139 above the diaphragm 144 of the vacuum control valve device 13 so that the chamber 139 is evacuated of fluid under pressure simultaneously as the vacuum brake pipe 10 is evacuated.

As shown in FIG. 2A of the drawings, the vacuum brake pipe 10 has disposed therein a pipe T 319 the side outlet of which is connected by a pipe 320 to the passageway 95 in the combined cut-out cock and strainer device 9, and the passageway 100 in the device 9 is connected by a pipe and passageway 321 to the chamber 88 in the cut-out valve device 8. Also, as shown in FIG. 2A, the chamber 76 in the cut-out valve device 8 is connected by a passageway and pipe 322 to the side outlet of the pipe T 301, the chamber 83 is connected by a passageway and pipe 323 to the side outlet of a pipe T 324, and the chamber 69 above the diaphragm 67 is connected by a passageway and pipe 325 to the side outlet of a pipe T 326 that is disposed in the pipe 24 that is connected at one end to engineer's automatic brake valve device 6 and at the opposite end to the passageway 192 in the manual change-over valve device 17. The pipe 24 is now charged to the desired normal charged value by the self-lapping unit of the engineer's automatic brake valve device 6. Therefore, fluid under pressure flows from the pipe 24 to the chamber 69 above the diaphragm 67 to deflect this diaphragm downward against the yielding resistance of the spring 73 to first effect seating of the valve 77 on the valve seat 79 and then unseat valve 86 from its valve seat 87. With the valve 86 unseated, a communication is established between the chambers 88 and 83 to connect the pipe and passageway 321 to the passageway and pipe 323 that is connected to the side outlet of the pipe T 324. One outlet of the pipe T 324 is connected by a pipe 327 to one inlet connection of a double check valve device 328 that has its side outlet connected by a pipe 329 to a power cut-out switch device 330 that is effective to cut off power to the driving motors of the respective locomotive unit in a manner hereinafter described. Disposed in the pipe 329 is a pipe T 331 the side outlet of which is connected by a pipe 332 to a dynamic cut-out switch device 333 that is disposed in a circuit that is closed when a handle of a dynamic brake controller (not shown) is moved to a position to effect an application of the dynamic brakes and opened when this handle is moved to a position to effect a release of the dynamic brakes.

The other outlet of the pipe T 324 is connected by a pipe 334 to the side outlet of a pipe T 335. One outlet of the pipe T 335 is connected by a pipe 336 to a quick release valve of a self-lapping type independent brake valve device 337 for controlling the brakes on the multi-unit locomotive independently of the brakes on the train in a manner hereinafter described in detail. The other outlet of the pipe T 335 is connected by a pipe 338 to the side outlet of a pipe T 339, one outlet of which is connected by a pipe 340 to the branch passageway 64a that extends from the flat face 65 on the lower side of the pipe bracket 25 through this pipe bracket and the casing section 31 of the service valve device 27 of the brake control valve device 7 and joins with the passageway 64 in the service valve device 27 intermediate the ends thereof. One end of the passageway 64 opens into the chamber 55 below the diaphragm 30 of the service valve device 27 and the opposite end of this passageway opens into the outlet chamber 63 above the flat disc check valve 58.

With the valve 86 of the cut-out valve device 8 now unseated, as hereinbefore explained, the vacuum brake pipe 10 is connected to the passageway 64 in the service valve device 27 of the brake control valve device 7 via pipe 320, combined cut-out cock and strainer device 9, pipe and passageway 321, chambers 88 and 83 in the cut-out valve-device 8, passageway and pipe 323 pipe T 324, pipe 334, pipe T 335, pipe 338, pipe T 339, pipe 340 and branch passageway 64a so that the chambers 55 and 63 are evacuated of fluid under pressure. As the chamber 63 is thus evacuated, fluid under pressure from the chamber 54 above the diaphragm 30 will flow via the passageway 61 and choke 62 to unseat the flat disc-type valve 58 against the yielding resistance of the spring 59 and establish a communication between the chambers 54 and 63 so that the chamber 54 is evacuated simultaneously with the chambers 63 and 55. Since the chambers 54 and 55 are thus evacuated simultaneously, the various components of the service valve device 27 of the brake control valve device 7 on the locomotive unit A will remain in their release position in which they are shown in FIG. 2B to maintain the brakes on the locomotive unit A released.

When the pressure in the fluid pressure brake pipe 1 has been increased to the hereinbefore-mentioned desired normal charged value, the self-lapping unit of the engineer's brake valve device 6 will lap off or cease to supply fluid under pressure to the fluid pressure brake pipe 1 and will maintain the desired normal pressure therein against leakage.

When the self-lapping unit of the engineer's brake valve device 6 ceases to supply fluid under pressure to the fluid pressure brake pipe 1 to increase the pressure therein above the desired normal charged value, there will be no further increase in the pressure in chamber 117 of the vacuum control valve device 13 and in chamber 216 of the differential pilot valve device 18.

Subsequent to cessation of the supply of fluid under pressure from the fluid pressure brake pipe 1 to the chamber 117 above the diaphragm 116, fluid under pressure will be evacuated from the chamber 139 above the diaphragm 144 until the constant pressure maintained in the chamber 145 below the diaphragm 144 establishes a force acting in an upward direction that is greater than the downward force established by the now constant pressure in the chamber 117 above the diaphragm 116. This preponderance of force acting in an upward direction is effective through the medium of the stem 140 to move the cylindrical slide valve 124 to the lap position in which it is shown in FIG. 2 and thereby close communication between the passageways 136 and 311 to prevent further evacuation of the vacuum brake pipe 10 by operation of the exhauster. It should be noted that as the diaphragm 144 is deflected upward, as just explained, the spring 152 is rendered effective to move the spool-type valve 148 upward until the collar 150 thereon contacts the upper end of the counterbore 147. In this position of the spool-type valve 148, the peripheral annular groove 149 thereon establishes a communication between the passageways 304 and 154.

Subsequent to cessation of the supply of fluid under pressure from the fluid pressure brake pipe 1 to the chamber 216 of the differential pilot valve device 18, the fluid under pressure in the chamber 216 will flow through the choke 218 to the chamber 217 and from thence through pipe 281 to the volume reservoir 280 until the pressures in the chambers 216 and 217 and volume reservoir 280 are all equal whereupon the spring 236 is rendered effective to deflect the diaphragm 208 and its follower assemblage upward until the follower plate 211 abuts the stop 237 on the casing section 209. Upon upward movement of the diaphragm assemblage toward the position shown in FIG. 2C, the spring 223 is rendered effective to bias the check valve 219 into contact with the annular valve seat 224 to close communication between the chambers 216 and 227 as the flange 282 on the collar 214 is moved away from the upper side of the check valve 219 by the further upward movement of the diaphragm assemblage to the position shown in FIG. 2C.

It may be noted at this point that the volume of the reservoir 280 is such that the time required for equalization of pressure from the chamber 216 into the chamber 217 and the reservoir 280 insures that the check valve 219 is not seated on the annular valve seat 224 until after the cylindrical slide valve 124 of the vacuum control valve device 13 has been moved to its lap position. Therefore, upon seating of the check valve 219 on the annular valve seat 224 to cut off flow of fluid under pressure from the chamber 216 to the chamber 227, the chamber 227 is open to atmosphere via passageway 229, pipe and passageway 304, peripheral annular groove 149 on the spool-type valve 148, passageway 154 and choke 305. Fluid under pressure is also now vented from the chamber 297 and the timing volume 295 connected thereto by the pipe 296, to atmosphere via pipe 294, pipe T 292, pipe 291, double check valve device 286, pipe 285, pipe T 284, pipe 283, passageway 228 and chamber 227 which is open to atmosphere as hereinbefore described. Upon the release of the fluid under pressure from the chamber 297 in the quick release valve device 14, the spring 161 is rendered effective to move the disc-shaped valve 160 into contact with the annular valve seat 162 so that the chambers 163 and 164 are connected only by the choke 167 through which the vacuum brake pipe 10 can be maintained against leakage by operation of the vacuum control valve device 13 which is of the self-lapping type. Furthermore, fluid under pressure is also released from the chamber 70 in the break-in-two protection valve device 19 to atmosphere via passageway 71, pipe 293, pipe T 292 and the path therefrom hereinbefore described.

INITIAL CHARGING—TRAILING LOCOMOTIVE UNIT

Let it now be assumed that the brake equipment shown in FIGS. 2, 2A, 2B, 2C and 2D is the equipment on one of the trailing units B or C of the multi-unit locomotive shown in FIG. 1, it being understood that the operation of the equipment on each trailing unit is the same. To condition the brake equipment shown in FIGS. 2, 2A, 2B, 2C and 2D for trailing unit operation, the spool-type selector valve 194 of the manual change-over valve device 17 must be shifted axially from a "Lead" position in which it is shown in FIG. 2A in the direction of the right hand to a second or "Trail or Dead" position.

To shift the spool-type selector valve 194 axially in the direction of the right hand from its first or "Lead" position to its second or "Trail or Dead" position, the engineer first pushes the handle 200 downward aaginst the biasing force of the spring 201 to disengage or unlock the pin 202 from a position-defining-notch in the cover member 202a. Next, the engineer will rotate the handle 200 so that the pin 202 through engagement with the rotatable member 198 effects rotation thereof whereupon the dog 197, eccentrically carried thereby and extending into the notch in the spool-type selector valve 194, effects shifting in the direction of the right hand of the spool-type selector valve 194 from its "Lead" position in which it is shown in FIG. 2A to its second or "Trail or Dead" position in which the pin 202 can be spring-pressed into another position-defining-notch in the cover member 202a upon the engineer releasing the handle 200.

As shown in FIG. 3, which is a diagrammatic development view showing the connections established in "Lead" and in "Trail or Dead" positions of the spool-type selector valve 194, when the spool-type selector valve 194 is shifted from its "Lead" position to its "Trail or Dead" position, the passageway 188 which is connected to the second main reservoir 4 via the pipe 298, pipe cross 302 and pipe 23 is cut off from the passageway 187 which is connected via the pipe 303, double check valve device 288 (FIG. 2C) and pipe 289 to the chamber 290 in the vacuum release valve device 16 (FIG. 2D), and the passageway 187 is open to atmosphere via the left-hand end of the bore 186 and the port 196 in the body 183 since the O-ring 207 adjacent the left-hand end of the peripheral annular groove 203 on the spool-type selector valve 194 is now disposed in a position on the right-hand side of the opening of the passageway 187 at the wall surface of the bore 186 in the body 183. Consequently, no fluid under pressure will be supplied from the second main reservoir 4 to the chamber 290 in the vacuum brake release valve device 16 on the respective trailing unit and the chamber 290 thereof will be open to atmosphere to render the spring 173 effective to seat the disc-shaped valve 172 on the annular valve seat 174 to close communication between the chambers 175 and 176.

Furthermore, as shown in FIG. 3, when the spool-type selector valve 194 is shifted from its "Lead" position to its "Trail or Dead" position, the peripheral annular groove 203 establishes a communication between the passageways 188 and 189 for a purpose hereinafter made apparent, the peripheral annular groove 204 cuts off communication between passageways 190 and 191, and the peripheral annular groove 205 cuts off communication between passageways 192 and 193.

As indicated diagrammatically in FIG. 1 of the drawings, the fluid pressure brake pipe 1 on the leading unit A is connected by the usual hose and hose couplings to the fluid pressure brake pipe 1 on the first trailing unit B, and likewise the fluid pressure brake pipe 1 on the first trailing unit B is connected to the fluid pressure brake pipe 1 on the second trailing unit C. Therefore, as fluid under pressure is supplied by the self-lapping unit of the engineer's automatic brake valve device 6 on the leading locomotive unit A from the first main reservoir 4 on this unit to the fluid pressure brake pipe 1 on the leading unit A as hereinbefore described, it will flow therefrom to the fluid pressure brake pipe 1 on the trailing units B and C so that the pressure in the fluid pressure brake pipe 1 of each of the three locomotive units is increased substantially simultaneously to the hereinbefore-mentioned desired normal charged value.

The fluid under pressure supplied to the fluid pressure brake pipe 1 on each trailing unit B and C will effect identical operation of the brake equipment on the respective trailing unit. Therefore, a description of the operation of the brake equipment on one trailing unit will suffice for both.

Assuming that the spool-type selector valve 194 of the manual change-over valve device 17 on each trailing unit has been moved to its "Trail or Dead" position, as has been explained, and that the apparatus on each trailing unit is initially void of fluid under pressure, the various other components of the apparatus on each trailing unit will be in the respective positions in which they are shown in FIGS. 2, 2A, 2B, 2C and 2D of the drawings.

As fluid under pressure is supplied from the fluid pressure brake pipe 1 on the leading locomotive unit A to the fluid pressure brake pipe 1 on the trailing units B and C, it will flow from the fluid pressure brake pipe 1 on the respective trailing unit to chamber 117 in the vacuum control valve device 13 on the respective trailing unit and operate this valve device in the manner hereinbefore described in detail to move the cylindrical slide valve 124 downward from its lap position in which it is shown in FIG. 2C to a position in which a communication is established between the passageway 136 and the passageway and pipe 311 via annular chamber 135, ports 137, cavity 132, ports 133 and annular chamber 134.

Fluid under pressure will also flow from the fluid pressure brake pipe 1 on the respective trailing unit to the chamber 216 in the corresponding differential pilot valve device 18 and operate this valve device in the manner hereinbefore described in detail to deflect the diaphragm 208 and its follower assemblage downward to move the check valve 219 out of contact with the annular valve seat 224 whereupon fluid under pressure will flow from the chamber 216 to the chamber 227 and thence to the pipe 283 and the pipe 304, which pipe 304 has been cut off from atmosphere by the operation of the vacuum control valve device 13 in the manner hereinbefore described in deatil.

Some of the fluid under pressure supplied to the pipe 283 flows via pipe T 284, pipe 285, double check valve device 286, pipe 291, pipe T 292 and pipe 294 to the timing volume reservoir 295 which is connected by the pipe 296 to the chamber 297 below the piston 168 of the quick release valve device 14 so that upon the pressure in the timing reservoir 295 and the chamber 297 increasing to a value sufficient to overcome the biasing force of the spring 161, the disc-shaped valve 160 will be moved upward against the yielding resistance of the spring 161 and out of seating contact with the annular valve seat 162 to establish a communication between the chambers 163 and 164 in the quick release valve device 14 on the respective trailing unit.

Also, some of the fluid under pressure supplied to the pipe 283 flows via the side outlet of pipe T 284 and the pipe 287 to the right-hand inlet of the double check valve device 288 to move the double check valve therein to its left-hand position, if it is not already in this position, to establish a communication between the pipe 287 and the pipe 289 whereupon the fluid under pressure being supplied to the pipe 287 from the pipe 283 flows via the pipe 289 to the chamber 290 in the vacuum brake release valve device 16 on the respective trailing unit. Fluid under pressure thus supplied to the chamber 290 is effective on the piston 179 to overcome the biasing force of the spring 173 and effect unseating of the disc-shaped valve 172 from the annular valve seat 174 to establish a communication between the chambers 175 and 176 in the vacuum brake release valve device 16 on the respective trailing unit.

The vacuum reservoir 5 on the respective trailing unit is now connected to the vacuum train pipe 10 on this trailing unit via pipe 165, chambers 164 and 163 in the quick release valve device 14, pipe 15, passageway 136, annular chamber 135, ports 137, cavity 132 in cylindrical slide valve 124, ports 133, and annular chamber 134 in the vacuum control valve device 13, passageway and pipe 311, pipe T 317, chambers 176 and 175 in the vacuum brake release valve device 16, pipe 312, filter device 313, pipe 314, pipe T 315 and pipe 316. Consequently, the exhauster on each respective trailing unit, which is connected to the vacuum reservoir 5 on the respective trailing unit by the pipe 166, will now operate to evacuate the vacuum brake pipe 10 on the respective trailing unit.

The handle 22 of the engineer's brake valve device 6 on each respective trailing unit is in its "Release" position. Therefore, the self-lapping unit of the engineer's brake valve device 6 on each respective trailing unit is effective to supply fluid under pressure from the second main reservoir 4 thereon to the chamber 69 of the corresponding cut-out valve device 8 (FIG. 2A) so that this valve device is effective to establish a communication hereinbefore described in detail between the chambers 54 and 55 in the brake control valve device 7 on each respective trailing unit and the corresponding vacuum brake pipe 10 so that the brakes on each respective trailing unit are maintained released in the same manner as the brakes on the leading unit A.

As indicated diagrammatically in FIG. 1 of the drawings, the vacuum brake pipe 10 on locomotive unit B is connected by suitable hose and couplings to the vacuum brake pipe 10 on the adjacent locomotive units A and C. Furthermore, when the three-unit locomotive is coupled to a train of cars, the vacuum brake pipe 10 on the locomotive unit C is connected to the vacuum train pipe (not shown) that extends through the train of cars each of which is provided with vacuum brake equipment. Therefore, the exhauster on each of the trailing locomotive units B and C will now assist the exhauster on the leading locomotive unit A in evacuating the vacuum brake pipe 10 extending through each locomotive unit and the train vacuum brake pipe extending through the cars in the train. The exhausters on the trailing locomotive units B and C will thus operate to assist the exhauster on the leading locomotive unit A until the pressure in the fluid pressure brake pipe 1 has increased to the normal charged value at which time the vacuum control valve device 13 on each of the three locomotive units A, B and C will move to its lap position in the manner hereinbefore explained in detail.

Furthermore, when the pressure in the fluid pressure brake pipe 1 has been increased to the normal charged value, the differential pilot valve device 18 on each of the three locomotive units A, B and C will operate in the manner hereinbefore explained to effect seating of the respective check valve 219 to cut off the flow of fluid under pressure from the fluid pressure brake pipe 1 via the pipe 278 and chamber 216 to the chamber 227 and pipes 283 and 304.

As hereinbefore explained, the pipe 304 is open to atmosphere upon movement of the vacuum control valve device 13 to its lap position in which it is shown in FIG. 2C of the drawings. Therefore, on the trailing units B and C, fluid under pressure will be vented from the chamber 297 in each respective quick release valve device 14, from the chamber 70 in each respective break-in-two protection valve device 19, and from the chamber 290 in each respective vacuum brake release valve device 16 to atmosphere via paths hereinbefore traced in detail, whereupon the spring 161 in each respective quick release valve device 14 will be rendered effective to seat the corresponding disc-shaped valve 160 to close the large capacity communication between the chambers 163 and 164 in each respective quick release valve device 14, and the spring 173 in each respective vacuum brake release valve device 16 will be rendered effective to seat the corresponding disc-shaped valve 172 to close communication between the chambers 175 and 176 in each respective vacuum brake release valve device 16.

With the vacuum control valve device 13 on each of the trailing units B and C in lap position and the quick release valve device 14 and the vacuum brake release valve device 16 on each of these trailing units closed, the vacuum reservoir 5 and the exhauster connected thereto on each trailing unit B and C will be cut off from the corresponding vacuum brake pipe 10 on the respective unit so that these exhausters are no longer effective to evacuate the vacuum brake pipe extending through the three locomotive units and the cars in the train.

On the leading locomotive unit A, the spool-type selector valve 194 of the manual change-over valve device 17 is in "Lead" position to effect the supply of fluid under pressure from the second main reservoir 4 to the chamber 290 in the vacuum release valve device 16 on this unit to maintain the corresponding disc-shaped valve 172 constantly unseated. Therefore, when the pressure in the fluid pressure brake pipe 1 has been increased to the normal charged value and the differential pilot valve device 18 on the leading unit A operates to effect seating of the corresponding check valve 219, fluid under pressure will be vented from the chamber 297 in the quick release valve device 14 and from the chamber 70 in the break-in-two protection valve device 19 on the leading unit A to atmosphere, but fluid under pressure will not be vented from the chamber 290 in the vacuum brake release valve device 16 on this leading unit. Therefore, on the leading unit A, a communication is maintained between the vacuum control valve device 13 and the vacuum brake pipe 10. Consequently, the vacuum control valve device 13 on the leading unit A is responsive to vacuum brake pipe leakage to establish a communication between the pipe 311 and the pipe 15, which pipe 15 is connected via chamber 163, choke 167 and chamber 164 in the quick release valve device 14 on the leading unit A, pipe 165, vacuum reservoir 5 and pipe 166 to the exhauster on the leading unit A so that this exhauster is rendered operatively effective to maintain the vacuum brake pipe extending through the three locomotive units A, B and C and the cars in the train against normal vacuum brake pipe leakage.

SERVICE APPLICATION OF BRAKES ON LEADING UNITS

As shown in FIG. 2B of the drawings, each locomotive unit is provided with a selector valve device 341 for conditioning the brake equipment on the respective unit for operation either as a leading unit or as a trailing or dead unit, and a self-lapping type relay valve device 342 operative in a manner hereinafter explained in detail to effect the supply of fluid under pressure from the second main reservoir 4 on the respective unit to the corresponding brake cylinder device 2 to apply the brakes on the respective unit.

The selector valve device 341 comprises a sectionalized casing having therein three parallel and spaced-apart bores 343, 344, and 345 in which are sealably and slidably mounted, respectively three spring-biased spool-type valves 346, 347 and 348. The bottom of the bore 343 is connected by a passageway and pipe 349 to the lower outlet connection of the pipe T 339 so that the lower end of the spool-type valve 346 is normally subjected to the subatmospheric pressure present in the vacuum brake pipe 10, the upper end of the bore 343 is connected by a passageway 350 in the sectionalized casing that opens at the wall surface of the bore 344 adjacent the lower end thereof. The upper end of the spool-type valve 347 is provided with a portion of reduced diameter, and opening at the wall surface of the bore 344 adjacent the lower end of this portion of reduced diameter is one end of a passageway 351 that is connected by a corresponding pipe to the side outlet of a pipe T 352 that is disposed in a main reservoir equalizing pipe 353 that extends from end to end of each respective locomotive unit and, as shown in FIG. 1 of the drawings, is connected by suitable hose and hose couplings to the adjacent end of the main reservoir equalizing pipe on the adjacent locomotive unit, it being understood that the end of the hose at the right-hand end of the equalizing pipe 353 on the leading unit A and the left-hand end of this pipe on the trailing unit C are closed by suitable dummy couplings.

As shown in FIG. 2A, a pipe T 354 is disposed in the main reservoir equalizing pipe 353 and has its side outlet connected by a pipe 355 to the first main reservoir 3, there being a one-way flow check valve device 356 disposed in the pipe 355. A choke 357 is connected in bypassing relation to the check valve device 356 so that fluid under pressure may flow at a rapid rate from the main reservoir equalizing pipe 353 to the first main reservoir 3 via the check valve device 356 and at a restricted rate from this reservoir to the pipe 353 via the choke 357 to prevent excessive waste of air in the event the pipe 353 is ruptured.

Since the main reservoir equalizing pipe 353 is normally charged to the pressure present in the first main reservoir 3, fluid under pressure will flow from the pipe 353 via the side outlet of the pipe T 352 (FIG. 2B) and pipe and passageway 351 to the interior of the bore 344 above the portion of reduced diameter on the upper end of the spool-type valve 347 to move this valve downward from the position in which it is shown in FIG. 2B to a position in which the lower end thereof abuts a stop 358 formed on the sectionalized casing of the selector valve device 341. In this position of the spool-type valve 347, a peripheral annular groove 359 thereon adjacent the lower end thereof establishes a communication between the passageway 350 and a passageway and pipe 360 that is connected to the side outlet of a pipe T 361. One end of the pipe T 361 is connected by a pipe and passageway 362 to the upper end of the bore 345 in the sectionalized casing of the selector valve device 341, and the other end of this pipe T is connected by a pipe 363 to the side outlet of a pipe T 364 (FIG. 2A). One end of the pipe T 364 is connected by a pipe 365 to one end of a double check valve device 366, and the other end of the pipe T 364 is connected by a pipe 367 to the passageway 189 in the pipe bracket 181 of the manual change-over valve device 17 which passageway 189 is open to atmosphere while the spool-type selector valve occupies its "Lead" position in which it is shown. Therefore, the upper end of the bores 343 and 345 are both open to atmosphere so that the respective spool-type valves 346 and 348 slidably disposed in these bores are spring-biased to their upper position in which they are shown in FIG. 2B to condition the brake equipment for lead unit operation. It should be noted at this point that the size of the spool-type valve 346 and the strength of the spring biasing it upward to the position shown are such as to prevent downward movement from this position by atmospheric pressure acting on the upper end thereof notwithstanding the fact that the lower end of this spool valve is not subject to a subatmospheric pressure.

While the spool-type valve 346 occupies the position shown in FIG. 2B, a peripheral annular groove 368 thereon establishes a communication between a passageway and pipe 369 and a passageway and pipe 370. The pipe 369 is connected to an electrically operated valve device 371 which forms no part of the present invention. Briefly, however, the electrically operated valve device 371 is connected in series with the hereinbefore-mentioned dynamic cut-out switch device 333 in the hereinbefore-mentioned circuit that is closed when the handle of the dynamic brake controller is moved to the position to effect an application of the dynamic brakes and opened when this handle is moved to the position to effect a release of the dynamic brakes. When this circuit is open, the electrically operated valve device 371 is moved by fluid under pressure supplied thereto from the pipe 310 via a branch pipe 310a to an open position in which it is shown in FIG. 2B to establish a communication between the pipe 369 and a pipe 372 that is connected to one end of a pipe T 373, the side outlet of which is connected by a pipe 374 to a volume reservoir 375, the purpose of which is to provide proper regulation of the operation of the relay valve device 342. The other end of the pipe T 373 is connected by a pipe and passageway 376 that extends through the pipe bracket 25 and casing section 31 of the brake control valve device 7 and opens at the wall surface of the bore 35. A branch passageway 376a having therein a choke 377 connects the passageway 376 to the chamber 33 above the diaphragm 29.

The pipe 370 is connected to one end of a double check valve device 378, the side outlet of which is connected by a pipe and passageway 379 to a chamber 380 in the relay valve device 342.

The relay valve device 342 may be of any suitable self-lapping type and comprises a diaphragm 381 operatively connected to a supply and release valve mechanism for controlling the supply of fluid under pressure from a passageway and pipe 382, that is connected to the side outlet of a pipe T 383 disposed in the hereinbefore-mentioned pipe 310 that is connected to the second main reservoir 4 via the pipe cross 302 and pipe 23, to a passageway and pipe 384 connected to the side outlet of a pipe T 385, one end of which is connected by a pipe 386 to the brake cylinder device 2 on the respective locomotive unit. The other end of the pipe T 385 is connected by a pipe 387 to one end of a pipe T 388, the side outlet of which is connected by a pipe 389 to the lower end of the hereinbefore-mentioned double check valve 366 (FIG. 2A), the side outlet of which is connected by a pipe and passageway 390 which passageway opens at the wall surface of the counterbore 269 in the brake application valve device 11 (FIG. 2).

The other end of the pipe T 388 is connected by a pipe and passageway 391 that opens at the wall surface of the bore 345 in the selector valve device 341. While the spool-type valve 348 occupies the position in which it is shown in FIG. 2B, a peripheral annular groove 392 thereon establishes a communication between the passageway 391 and one end of a passageway 393 that opens at the wall surface of the bore 345 above the location at which the passageway 391 opens at this wall surface. The opposite end of the passageway 393 opens at the wall surface of the bore 344.

As hereinbefore stated, fluid under pressure supplied from the main reservoir equalizing pipe 353 to the interior of the bore 344 above the spool-type valve 347 has moved this valve from the position in which it is shown in FIG. 2B downward to a position in which the lower end thereof abuts the stop 358. In this lower position of the spool-type valve 347, a peripheral annular groove 394 thereon, which is located above the hereinbefore-mentioned peripheral annular groove 359 on this spool-type valve, establishes a communication between the passageway 393 and a passageway and pipe 395 open at one end at the wall surface of the bore 344 above the opening of the passageway 393 at this wall surface. The pipe 395 is connected at its other end to the side outlet of a pipe T 396 that is disposed in a brake cylinder equalizing pipe 397 that extends from end to end of each locomotive unit and, as shown in FIG. 1 of the drawings, is connected by suitable hose and hose couplings to the adjacent end of the brake cylinder equalizing pipe on the adjacent locomotive unit, it being understood that the end of the hose at the right-hand end of the brake cylinder equalizing pipe on the leading unit A and the left-hand end of this pipe on the trailing unit C are closed by suitable dummy couplings.

In order to provide a source of fluid under pressure from which the brake control valve device 7 can supply fluid at the desired pressure to the relay valve device 342 to effect operation thereof, a reducing valve device 398 (FIG. 2A) is included in the brake equipment of each of the locomotive units A, B and C. A supply passageway in the reducing valve device 398 is connected by a pipe 399 to the side outlet of the pipe T 299, which, as hereinbefore mentioned, is connected via pipes 298 and 23 to the second main reservoir 4. A delivery passageway in the reducing valve device 398 is connected by a pipe and passageway 400 that extends through the pipe bracket 25 and casing section 31 of the brake control valve device 7 to the chamber 36 in the casing section 31 so that this chamber is constantly supplied with fluid under pressure at the desired reduced pressure at a rate determined by a service choke 401 disposed in this passageway and carried by the pipe bracket 25.

Assume that the brake equipment shown in FIGS. 2, 2A, 2B, 2C and 2D is the brake equipment on the leading locomotive unit A shown in FIG. 1, and let it be supposed that the engineer desires to effect a service brake application on the entire train.

To manually effect a service application of brakes on the multi-unit locomotive and connected cars of a train, the engineer will move brake valve handle 22 (FIG. 2) of the engineer's brake valve device 6 on leading unit A arcuately from its "Release" position into a service zone (extending between "Release" position and "Full Service" position) an extent corresponding to the degree of service application desired. When the brake valve handle 22 is moved into the service zone, the self-lapping unit of the engineer's brake valve device 6 is operated to vent fluid under pressure from the fluid pressure brake pipe 1 to atmosphere via pipe T 276 (FIG. 2), pipe 275, pipe T 274, pipe and passageway 273, peripheral annular groove 272 on application valve 101 in brake application valve device 11, passageway and pipe 271, passageway 193 in pipe bracket 181 and body 183 of manual change-over valve device 17 (FIG. 2A), peripheral annular grove 205 on spool-type selector valve 194, passageway 192, pipe 24 and the self-lapping unit until the pressure in the fluid pressure brake pipe 1 is reduced a corresponding degree.

As the pressure in the fluid pressure brake pipe 1 is reduced, the pressure in the chamber 117 in the vacuum control valve device 13 (FIG. 2C) and the chamber 216 in the differential pilot valve device 18 is correspondingly reduced.

The reduction in the pressure in the chamber 117 of the vacuum control valve device 13 is effective to cause the cylindrical slide valve 124 to be shifted upward to an application position by the constant fluid pressure in the chamber 145 acting on the diaphragm 144 in opposition to the reduced fluid pressure brake pipe pressure in the chamber 117 and subatmospheric pressure in the chamber 139, fluid under pressure in volume reservoir 307 serving to stabilize the pressure in the chamber 145 against the increase in the volume of this chamber resulting from upward deflection of the diaphragm 144.

As the cylindrical slide valve 124 is moved upward from the position in which it is shown in FIG. 2C, the cavity 132 therein will connect the passageway and pipe 311 to the passageway and pipe 131 via annular chamber 134, lower ports 133, cavity 132, upper ports 133, and annular chamber 129 for admitting filtered atmospheric air via intake filter 130 to the pipe 311 which is connected to the vacuum brake pipe 10 via pipe T 317, chambers 176 and 175 in the vacuum brake release valve device 16 on leading unit A, the disc-shaped valve 172 being now unseated, pipe 312, filter device 313, pipe 314, pipe T 315 and pipe 316. Since the chamber 139 in the vacuum control valve device 13 is connected via passageway and pipe 318 to the side outlet of the pipe T 317, atmospheric air will flow to the chamber 139 and to the vacuum brake pipe 10 until the pressure in the chamber 139 is increased to a degree corresponding to the degree of reduction in fluid pressure brake pipe pressure in the chamber 117 whereupon the diaphragm stack and the cylindrical slide valve 124 will be shifted downward to the lap position shown in FIG. 2C to cut off further flow of atmospheric air to the vacuum brake pipe 10 and the chamber 139 and trap the fluid therein.

As filtered atmospheric air is admitted to the vacuum brake pipe 10, it will flow therefrom to the chamber 55 in the service valve device 25 of the brake control valve device 7 via pipe T 319 (FIG. 2A), pipe 320, combined cut-out cock and strainer device 9, pipe and passageway 321, chambers 88 and 83 in the cut-out valve device 8 (it being understood that in effecting a service brake application, the pressure in the fluid pressure brake pipe 1 which is present in the chamber 69 above diaphragm 67 is not reduced sufficiently for the spring 73 to move the stem 75 to the position shown in FIG. 2A to unseat valve 77 and render spring 89 effective to seat valve 86), passageway and pipe 323, pipe T 324, pipe 334, pipe T 335, pipe 338, pipe T 339, pipe 340, branch passageway 64a and passageway 64, it being understood that the flat disc-type valve 58 is pressed by spring 59 against its seat 60 to prevent flow from the passageway 64 and chamber 63 to the chamber 54 via passageway 61 so that the subatmospheric pressure present in the chamber 54 is trapped therein.

The supply of atmospheric air to the chamber 55 below the diaphragm 30 in the manner just explained increases the pressure therein above that present in the chamber 54 above the diaphragm 30. Therefore, the higher pressure in the chamber 55 will deflect the diaphragm 30 in an upward direction and, through the intermediary of the pusher stem 56, move the valve stem 37 upward and cause the upper end of the valve stem 37 to first contact the bottom face of a flat disc valve 402 disposed in the chamber 36 and biased by a spring 403 against an annular valve seat 404 formed at the upper end of the bore 35 to close communication between the pipe and passageway 376 that opens at the wall surface of the bore 35 and atmosphere via passageway 47, peripheral annular groove 46, passageway 48 and brake cylinder exhaust choke 49. As the valve stem 37 continues to move upward, the flat disc valve 402 will be unseated from the annular valve seat 404. By unseating of the flat disc valve 402, fluid under pressure from the reducing valve device 398 is permitted to flow by way of pipe and passageway 400, and the service choke 401 carried by the pipe bracket 25 and disposed in the passageway 400 to the chamber 36, thence past the now unseated flat disc valve 402 to the interior of the bore 35 from which it flows through passageway and pipe 376, pipe T 373, pipe 372, electrically operated valve device 371 now in its open position shown in FIG. 2B (it being assumed that the dynamic brakes were not applied prior to the pneumatic brakes), pipe and passageway 369, peripheral annular groove 368 on spool-type valve 346 in selector valve device 341, passageway and pipe 370, double check valve device 378 and pipe and passageway 379 to the chamber 380 in the relay valve device 342. Fluid under pressure also flows to the volume reservoir 375 via the side outlet of pipe T 373 and pipe 374. The relay valve device 342 operates in response to the supply of fluid under pressure to the chamber 380 therein to effect the supply of a corresponding pressure to the brake cylinder device 2 on the leading unit A to cause an application of brakes on this unit.

Fluid under pressure flows from the passageway 376 in the brake control valve device 7 via branch passageway 376a and choke 377 to the chamber 33 and is effective to establish a force that acts in a downward direction on the upper side of the diaphragm 29. Upon this force slightly exceeding the force acting upward on the diaphragm 30 as a result of admitting atmospheric air to the chamber 55 caused by the reduction of pressure in the fluid pressure brake pipe 1, the valve stem 37 will be moved downward until the spring 403 seats the flat disc valve 402 on the annular valve seat 404. This cuts off flow of fluid under pressure from the reducing valve device 398 to the relay valve device 342 which, in turn, moves to a lap position to cut off flow of fluid under pressure to the brake cylinder device 2 on leading unit A.

Therefore, after the pressure of fluid in the fluid pressure brake pipe 1 becomes stabilized at a value determined by the position in its service zone to which the engineer moved the handle 22 of the brake valve device 6 on the leading locomotive unit A, the supply of atmospheric air to the vacuum brake pipe 10 is cut off to correspondingly stabilize the subatsmopheric pressure therein, whereupon the supply of fluid under pressure from the reducing valve device 398 to the relay valve device 342 will be terminated so that the relay valve device 342 in turn moves to a lap position to correspondingly terminate the supply of fluid under pressure to the brake cylinder device 2 on leading unit A. The seating of the flat disc valve 402 on the annular valve seat 404 is effective to hold the desired pressure of fluid in the pipe 379 connected to the relay valve device 342 and hence in the brake cylinder device 2 on leading unit A.

It will be understood that each vacuum type brake cylinder device on each car in the train will operate in response to the admittance of atmospheric air to the train vacuum brake pipe to effect a brake application on the respective car corresponding to the increase in subatmospheric pressure effected in the train vacuum brake pipe.

SERVICE APPLICATION OF BRAKES ON TRAILING UNIT

Assume that the brake equipment shown in FIGS. 2, 2A, 2B, 2C and 2D is the brake equipment on a trailing locomotive unit such as the unit B or the unit C shown in FIG. 1, and that the spool-type selector valve 194 of the manual change-over valve device 17 is shifted in the manner hereinbefore explained from its "Lead" position to its "Trail or Dead" position to condition the brake equipment for trailing unit operation.

When the spool-type selector valve 194 is shifted to its "Trail or Dead" position, the passageway 187 in the pipe bracket 181 and body 183 of the change-over valve device 17 is connected to atmosphere, as hereinbefore explained, so that fluid under pressure is no longer supplied from the second main reservoir 4 to the chamber 290 in the vacuum brake release valve device 16 on the respective trailing unit via the corresponding change-over valve device 17.

Furthermore, when the spool-type selector valve 194 is shifted to its "Trail or Dead" position, the peripheral annular groove 203 thereon establishes a communication between the passageways 188 and 189 whereupon fluid under pressure flows from the second main reservoir 4 via pipe 23, pipe cross 302, pipe 298, passageway 188, the peripheral annular groove 203, passageway 189, pipe 367, pipe T 364, pipe 365 and double check valve device 366 to pipe and passageway 390 in the brake application valve device 11 and thence via a peripheral annular groove 405 on suppression valve 102 and a passageway 406 extending therethrough and through a stem 407 to a chamber 408 above a piston 409 that is connected by the stem 407 to the suppression valve 102. Fluid under pressure thus supplied to chamber 408 moves the piston 409 and the suppression valve 102 downward from the position in which they are shown in FIG. 2 against the yielding resistance of a spring 410 to a position in which the suppression valve 102 closes communication between the branch passageway 242b and passageway and pipe 270 that is connected to the foot valve device 12. Consequently, it is not necessary that the pedal 104 of the foot valve device 12 on the respective trailing locomotive unit be held depressed.

Fluid under pressure also flows from the side outlet of the pipe T 364 via pipe 363, pipe T 361, and pipe and passageway 362 to the upper end of the bore 345 in the selector valve device 341 on the respective trailing unit. Fluid under pressure thus supplied to the upper end of the bore 345 is effective to move the spring-biased spool-type valve 348 downward from the position shown in FIG. 2B to a position in which the lower end of spool-type valve 348 contacts a stop 411 formed on the sectionalized casing of the selector valve device 341. In this position of the spool-type valve 348, the perpiheral annular groove 392 closes a communication between the passageways 391 and 393, and a peripheral annular groove 412 on the spool-type valve 348 spaced above the peripheral annular groove 392 thereon establishes a communication between the passageway 393 and a passageway and pipe 413 that is connected to the side outlet of a pipe T 414 (FIG. 2A). One outlet of the pipe T 414 is connected by a pipe 415 to the passageway 191 in the pipe bracket 181 and body 183 of the change-over valve device 17, which passageway 191 is now cut off from the passageway 190 since the spool-type selector valve 194 is in its "Trail or Dead" position, as hereinbefore stated. The other outlet of the pipe T 414 is connected by a pipe 416 to the left-hand end of the double check valve device 378 (FIG. 2B).

Fluid under pressure also flows from the side outlet of the pipe T 361 to the pipe and passageway 360. Fluid under pressure is now supplied from the main reservoir equalizing pipe 353 via pipe T 352 and pipe and passageway 351 to the bore 344 to maintain the spool-type valve 347 in its lower position in which the lower end thereof abuts the stop 358, as hereinbefore explained. Therefore, the peripheral annular groove 359 on the spool-type valve 347 establishes a communication between the pipe and passageway 360 and the passageway 350 so that fluid under pressure flows from the passageway 360 via the passageway 350 to the upper end of the bore 343 and is effective to move the spring-biased spool-type valve 346 downward from the position in which it is shown in FIG. 2B to a position in which the lower end thereof abuts a stop 417 on the sectionalized casing of the selector valve device 341. In the lower position of the spool-type valve 346, the peripheral annular groove 368 thereon cuts off communication between the pipe and passageway 369 and the pipe and passageway 370 so that operation of the relay valve device 342 on a trailing unit is no longer under the control of the brake control valve device 7 on the trailing unit, but is operated by fluid under pressure supplied from the brake cylinder equalizing pipe 397 to the chamber 380 of the relay valve device 342 via the side outlet of pipe T 396, pipe and passageway 395, peripheral annular groove 394 on spool-type valve 347 which is now in its lower position, passageway 393, peripheral annular groove 412 on spool-type valve 348 which is also now in its lower position, passageway and pipe 413, pipe T 414, pipe 416, double check valve device 378, and pipe and passageway 379, it being understood that the brake cylinder equalizing pipe 397 on the trailing unit is coupled to the brake cylinder equalizing pipe 397 on the leading unit and is supplied with fluid under pressure therefrom.

From the foregoing, it is apparent that fluid under pressure supplied by the relay valve device 342 on the leading locomotive unit A to the brake cylinder device 2 on the leading unit A also flows via pipe 387, pipe T 388, pipe and passageway 391, peripheral annular groove 392 on spool-type valve 348 of the selector valve device 341 on leading unit A which spool-type valve is in its upper position as shown in FIG. 2B, passageway 393, peripheral annular groove 394 on spool-type valve 347 which is in its lower position at this time, passageway and pipe 395, and pipe T 396 to the brake cylinder equalizing pipe 397 on the leading locomotive unit A and thence to the brake cylinder equalizing pipe 397 on the respective trailing unit from which it flows via side outlet of pipe T 396, pipe 395, the path hereinbefore traced in the selector valve device 341 on the respective trailing unit, pipe 413, pipe T 414, pipe 416, double check valve device 378 and pipe 379 to the chamber 380 of the relay valve device 342 on the respective trailing unit so that this relay valve device 342 is operated thereby to supply fluid under pressure to the corresponding brake cylinder device 2 on the respective trailing unit to effect a brake application thereon.

The reduction in pressure in the fluid pressure brake pipe 1 effected by moving the handle 22 of the engineer's brake valve device 6 on the leading locomotive unit A from its "Release" position to a selected position in its service zone effects a corresponding reduction in pressure in the chamber 117 of the vacuum control valve device 13 on the respective trailing unit whereupon this vacuum control valve device 13 operates in the manner hereinbefore described to admit atmospheric air into the pipe 311. However, the disc-shaped valve 172 in the vacuum brake release valve device 16 on the respective trailing unit is seated at this time. Therefore, no atmospheric air is admitted to the vacuum brake pipe 10 on the respective trailing unit by operation of the vacuum control valve device 13 on the respective trailing unit. Consequently, operation of the vacuum brakes on the cars in the train are controlled solely by operation of the vacuum control valve device 13 on the leading locomotive unit A, it being remembered that the disc-shaped valve 172 of the vacuum brake release valve device 16 on the leading locomotive unit A is always unseated to establish a communication between pipe 311 and the vacuum brake pipe 10 via pipe 312, filter device 313, pipe 314, pipe T 315 and pipe 316.

RELEASE OF A BRAKE APPLICATION

To release a brake application on the locomotive comprising the units A, B and C shown in FIG. 1 and the connected cars of a train coupled thereto, the handle 22 of the engineer's brake valve device 6 on the leading unit A is moved from the position it occupies in its service zone to its "Release" position for causing the fluid pressure brake pipe 1 to be recharged to its normal charged value.

The vacuum control valve device 13 on the leading locomotive unit A will operate in response to the supply of fluid under pressure from the fluid pressure brake pipe 1 to the chamber 117 thereof to connect the pipe 15 to the pipe 311. It being remembered that the disc-shaped valve 172 of the vacuum brake release valve device 16 on the leading unit A is now unseated, the pipe 311 is therefore connected to the vacuum brake pipe 10.

The differential pilot valve device 18 on the leading unit A operates in response to the increase in the pressure in the fluid pressure brake pipe 1 in the manner hereinbefore described in detail to supply fluid under pressure to the chamber 297 in the quick release valve device 14 on the leading unit A to effect unseating of the corresponding disc-shaped valve 160 whereupon a large capacity communication is established between the vacuum brake pipe 10 and the exhauster on the leading unit A via the vacuum brake release valve device 16, the vacuum control valve device 13 and the quick release valve device 14 on this unit so the exhauster on the leading unit A operates to effect evacuation of the vacuum brake pipe 10 and the train vacuum brake pipe extending through the cars in the train.

Evacuation of the vacuum brake pipe 10 effects a corresponding evacuation of the chamber 55 in the brake control valve device 7 so that the pressure in the chamber 55 is reduced to the trapped subatmospheric pressure in the chamber 54. Evacuation of the chamber 55 renders the spring 43 effective to move the diaphragm 29 and the valve stem 37 downward whereupon the upper end of the valve stem 37 is moved away from the lower side of the flat disc valve 402 to the position shown in FIG. 2B. Upon movement of the valve stem 37 to the position shown in FIG. 2B, fluid under pressure is vented from the chamber 380 in the relay valve device 342 on the leading unit A to atmosphere via passageway and pipe 379, double check valve device 378, pipe and passageway 370, peripheral annular groove 368 on spool-type valve 346, passageway and pipe 369, electrically operated valve device 371 (it being assumed that the dynamic brakes were not applied), pipe 372, pipe T 373, passageway and pipe 376, bore 35, passageway 47 in valve stem 37, peripheral annular groove 46 on valve stem 37, passageway 48 and choke 49. Since chamber 33 is connected via choke 377 and branch passageway 376a to the passageway 376 and volume reservoir 375 is connected via pipe 374 and pipe 376 to this passageway, the chamber 33 and reservoir 375 are also vented to atmosphere. The relay valve device 342 on the leading unit A operates in response to venting of the chamber 380 therein to correspondingly vent fluid under pressure from brake cylinder device 2 and the brake cylinder equalizing pipe 397 on the leading unit A to effect a release of the brakes on this unit.

Since the brake cylinder equalizing pipe 397 on the leading unit A is connected to the brake cylinder equalizing pipe 397 on the trailing units B and C and the equalizing pipe 397 on each respective trailing unit is connected through the selector valve device 341 on the respective trailing unit to the corresponding relay valve device 342, the relay valve device 342 on the respective trailing units B and C will operate in response to the venting of fluid under pressure from the brake cylinder equalizing pipe 397 to release fluid under pressure from the corresponding brake cylinder device 2 to effect a release of the brakes on the respective trailing units B and C.

The vacuum control valve device 13 and the differential pilot valve device 18 on each of the trailing units B and C will operate in response to an increase in the fluid pressure brake pipe 1 up to the normal charged value in the manner hereinbefore described in detail to establish a communication between the exhauster on each respective trailing unit and the corresponding vacuum brake pipe 10 so that the exhausters on the trailing units B and C operate simultaneously with the exhauster on the leading unit A to assist in evacuating the train vacuum brake pipe to cause a release of the brakes on the cars in the train.

EMERGENCY APPLICATION AND RELEASE OF BRAKES

To effect an emergency application of brakes, the handle 22 of the engineer's brake valve device 6 on the leading locomotive unit A shown in FIG. 1 is moved to its "Emergency" position in which the vent valve device of the brake valve device 6 is opened to vent fluid under pressure from the fluid pressure brake pipe 1 at an emergency rate, it being understood that the brake valve device 6 will perform all the service operations hereinbefore described since the handle 22 is moved through the service application zone to its "Emergency" position.

Since the pressure in the fluid pressure brake pipe 1 is reduced to zero when an emergency application is made, the pressure in the chamber 69 of the cut-out valve device 8 on the leading locomotive unit A is likewise reduced to zero, whereupon the spring 73 is effective to deflect the diaphragm 67 and diaphragm follower 72 upward to the position shown in FIG. 2A. As the diaphragm follower 72 moves upward to the position shown in FIG. 2A, it is effective through the intermediary of the stem 75 and forked connection 78 to move valve 77 upward thereby rendering spring 89 effective to seat valve 86 on valve seat 87 thereby closing communication between passageway and pipe 321, which is connected to the vacuum brake pipe 10 via combined cut-out cock and strainer device 9 and pipe 320, and passageway and pipe 323. Subsequent to seating of valve 86 on seat 87, valve 77 is lifted from its seat 79 whereupon fluid under pressure flows from the second main reservoir 4 to the chamber 55 below the diaphragm 30 of the brake control valve device 7 on the leading locomotive unit A via pipe 23, pipe cross 302, pipe 298, pipe T 301, pipe and passageway 322, chamber 76, past now unseated valve 77, through bore 85 to chamber 83 and thence through passageway and pipe 323, pipe T 324, pipe 334, pipe T 335, pipe 338, pipe T 339, pipe 340, branch passageway 64a and passageway 64.

Fluid under pressure also flows from the bottom outlet of the pipe T 324 to the dynamic cut-out switch device 333 via pipe 327, double check valve device 328, pipe 329, pipe T 331 and pipe 332 to cause the switch device 333 to open the hereinbefore-mentioned circuit which is effective to deenergize the electrically operated valve device 71 that is connected in series with the switch device 333 in this circuit if the handle of the dynamic brake controller had been moved to the position to effect an application of the dynamic brakes prior to moving the handle 22 of brake valve device 6 to its "Emergency" position. Upon deenergization of the electrically operated valve devce 371, if it were not already deenergized prior to moving the handle 22 to its "Emergency" position, a communication is established between pipes 369 and 372 to insure a pneumatic brake application upon a reduction in the pressure in chamber 69 of the cut-out valve device 8 to zero as the result of an emergency brake application.

Fluid under pressure also flows from the pipe 329 to the power cut-out switch 330 to effect the cutoff of electric current to the driving motors on the leading locomotive unit A.

The supply of fluid under pressure from the second main reservoir 4 to the chamber 55 in the brake control valve device 7 on leading unit A establishes a differential fluid pressure force on the diaphragm 30 since a subatmospheric pressure is trapped in the chamber 54 above the diaphragm 30, which differential fluid pressure force is effective to operate the brake control valve device 7 on the leading unit A in the manner hereinbefore described to supply fluid under pressure from the reducing valve device 398 on the unit A to the corresponding relay valve device 342 which is operated thereby to effect in the manner hereinbefore described the supply of fluid under pressure from the second main reservoir 4 on the unit A to the corresponding brake cylinder device 2 and through the selector valve device 341 on the unit A to the brake cylinder equalizing pipe 397 on the unit A. Fluid under pressure thus supplied to the brake cylinder equalizing pipe 397 on leading unit A flows therefrom to the brake cylinder equalizing pipe 397 on the trailing units B and C to effect an application of brakes on these trailing units in the manner hereinbefore described in detail.

The reduction in pressure in the fluid pressure brake pipe 1 to zero effects a corresponding reduction in the pressure in the chamber 117 of the vacuum control valve device 13 on the leading unit A whereupon this valve device 13 operates to establish a communication between the pipe and passageway 131 and the pipe and passageway 311 to admit atmospheric air to chamber 139 above the diaphragm 144 and to the vacuum brake pipe 10 which is connected to the train vacuum brake pipe via the vacuum brake pipe 10 on the trailing units B and C. The admittance of atmospheric air to the train vacuum brake pipe raises the pressure therein to atmospheric pressure and effects a full service brake application on each car in the train.

An emergency application of brakes is released in the same manner as hereinbefore described in connection with a release of a service application.

INDEPENDENT APPLICATION AND RELEASE OF LOCOMOTIVE BRAKES

The self-lapping type independent brake valve device 337 (FIG. 2A) has a supply passage that is connected by a pipe 418 to the side outlet port of the pipe T 300, which pipe T 300 is connected to the second main reservoir 4 via pipe 298, pipe cross 302 and pipe 23, and a delivery passageway that is connected by a pipe 419 to the passageway 190 that extends through the pipe bracket 181 and body 183 of the manual change-over valve device 17. While the spool-type selector valve device 194 occupies its "Lead" position as shown in FIG. 2A, the peripheral annular groove 204 thereon establishes a communication between the passageway 190 and the passageway 191 which is connected to the chamber 380 of the relay valve device 342 via pipe 415, pipe T 414, pipe 416, double check valve device 378 and pipe 379.

It may be noted that the independent brake valve device 337 is thus connected to the relay valve device 342 in by-pass of the electrically operated valve device 371, thus insuring that the brakes on the locomotive can always be controlled by the independent brake valve device 337 regardless of whether or not the handle of the dynamic brake controller has been moved to the position to effect closing of the hereinbefore-mentioned circuit and an application of the dynamic brakes.

The quick release valve device of the independent brake valve device 337 is connected by a pipe 420 to the side outlet of a pipe T 421. One end of the pipe T 421 is connected by a pipe 422 to a vacuum control reservoir 423 and the opposite end is connected by a pipe and passageway 424 to the passageway 61 that opens into the chamber 54 above the diaphragm 30 of the brake control valve device 7. The purpose of the vacuum control reservoir 423 is to control equalization of pressures between the chambers 55 and 54 of the brake control valve device 7 when effecting an independent release of an automatic application of the locomotive brakes in a manner hereinafter described.

To effect an independent service application of the brakes on the units A, B and C of the multi-unit locomotive only, the engineer will move a handle 425 of the independent brake valve device 337 on the leading unit A arcuately from a "Release" position into a service zone an extent corresponding to the degree of service application desired. When the brake valve handle 425 is moved into the service zone, the self-lapping unit of the independent brake valve device 337 is operated to effect the supply of fluid under pressure from the second main reservoir 4 via pipe 23, pipe cross 302, pipe 298, pipe T 300, pipe 418 to the pipe 419 from whence it flows to the chamber 380 of the relay valve device 342 on the leading unit A via the passageways 190 and 192 connected by the peripheral annular groove 204 on the spool-type selector valve 194 of the manual change-over valve device 17 on the leading unit A, pipe 415, pipe T 414, pipe 416, double check valve device 378, and pipe 379. The relay valve device 342 on the leading unit A now operates in the manner hereinbefore described to supply fluid under pressure from the corresponding second main reservoir 4 to the brake cylinder device 2 on the leading unit A to apply the brakes on this unit and to the brake cylinder equalizing pipe 397 via the selector valve device 341 on the leading unit A to effect an application of the brakes on the trailing units B and C in the manner hereinbefore described in detail.

To release the independent application of the brakes on the units A, B and C of the multi-unit locomotive, the engineer will move the handle 425 of the independent brake valve device 337 on the leading unit A from the position it occupies in its service zone to its "Release" position. As the handle 425 is thus moved from the position it occupies in its service zone toward and to its "Release" position, the self-lapping unit of the independent brake valve device 337 on the leading unit A operates to correspondingly vent fluid under pressure from the chamber 380 of the relay valve device 342 on the leading unit A whereupon this relay valve device operates to vent fluid under pressure from the brake cylinder device 2 on the unit A and from the brake cylinder equalizing pipe 397 to effect a release of the brakes on the trailing units B and C in the manner hereinbefore described in detail.

Let it be supposed that the dynamic brakes have not been applied, that an automatic brake application of the brakes has been effected on the three units A, B and C of the multi-unit locomotive and on the cars in the train by the engineer moving the handle 22 of the engineer's brake valve device 6 on the leading unit A from its "Release" position arcuately into the service zone an extent corresponding to the degree of service application desired, and that, subsequent to thus effecting an automatic service application, the engineer desires to effect a quick release of the brakes on the units A, B and C of the multi-unit locomotive only.

To effect a quick release of the brakes on the multi-unit locomotive only, the engineer will now move the handle 425 of the independent brake valve device 337 on the leading unit A from its "Release" position arcuately in a direction opposite to the direction in which the handle 425 is moved to effect an independent brake application to a "Quick Release" position. When the handle 425 is moved to its "Quick Release" position, the quick release valve of the independent brake valve device 337 establishes a communication between pipe 336 and pipe 420. Since pipe 336 is connected to chamber 55 below diaphragm 30 of the brake control valve device 7 via pipe T 335, pipe 338, pipe T 339, pipe 340, branch passageway 64a and passageway 64, and pipe 420 is connected to chamber 54 above diaphragm 30 via pipe T 421, pipe and passageway 424 and passageway 61, an equalization of the subatmospheric pressures in the chambers 54 and 55 will occur. This equalization of pressure on the opposite sides of the diaphragm 30 renders the spring 43 effective to move the valve stem 37 and the diaphragm stack downward to the position shown in FIG. 2B. As the valve stem 37 is thus moved downward, the spring 403 biases the flat disc valve 402 into contact with the upper end of the valve stem 37 until the flat disc valve 402 contacts the annular valve seat 404 which prevents further downward movement of the flat disc valve 402.

As the valve stem 37 continues to be moved downward by the spring 43 subsequent to the spring 403 effecting seating of the flat disc valve 402 on the annular valve seat 404, the upper end of the valve stem 37 is moved away from the lower side of the flat disc valve 402. Upon movement of the upper end of the valve stem 37 away from the lower side of the flat disc valve 402, the chamber 380 in the relay valve device 342 on the leading locomotive unit A is connected to atmosphere via pipe 379, double check valve 378, pipe and passageway 370, peripheral annular groove 368 on spool-type valve 346 of selector valve 341 device on the leading unit A, passageway and pipe 369, electrically operated valve device 371 now in its open position shown in FIG. 2 since, as hereinbefore stated, the dynamic brakes have not been applied, pipe 372, pipe T 373, pipe and passageway 376, bore 35, passageway 47 in valve stem 37, peripheral annular groove 46 on valve stem 37, passageway 48 and brake cylinder exhaust choke 49.

The relay valve device 342 on the leading unit A operates in response to the venting of fluid under pressure from the chamber 380 thereof to effect a release of fluid under pressure from the corresponding brake cylinder device 2 to release the brakes on the leading unit A and from the brake cylinder equalizing pipe 397 to effect a release of the brakes on the trailing units B and C in the manner hereinbefore described.

BREAK-IN-TWO PROTECTION FEATURE

(a) Break-in-two of any two cars in the train

The break-in-two protection feature provides an automatic application of brakes on the locomotive and of vacuum brakes on the cars and cut-off of locomotive power in the event of rupture of the train vacuum brake pipe hose, such as due to break-in-two of the train. This break-in-two application may be partly suppressed on the locomotive and on the cars still connected to the locomotive by operation of a valve device 426 (FIG. 2C), in the manner presently to be described.

The valve device 426 may be identical in construction to the hereinbefore-mentioned manually operated on-off valve device 247 (FIG. 2). Therefore, for convenience, only a part of the valve device 426 is shown in section, the remainder being shown in outline, and corresponding parts of the two valve devices are identified by the same reference numerals without additional description.

If, with the brake valve handle 22 of the engineer's brake valve device 6 on the leading locomotive unit A in its "Release" position and the apparatus on all three locomotive units charged in the manner described in connection with initial charging so that the brakes on the multi-unit locomotive and on the train coupled thereto are released, a hose connection in the train vacuum brake pipe extending from car to car in the train and connected between two adjacent cars is parted or ruptured, as, for example, from a break-in-two of the train, the resulting admission of atmospheric air to the train vacuum brake pipe will cause a full service application of the vacuum brakes on the parted cars and also on the still connected cars and locomotive unless partly suppressed by the engineer in a manner hereinafter described.

Assuming that subsequent to a break-in-two of the train, the engineer does not manually operate the valve device 426 on the leading unit A to partly suppress a break-in-two brake application on the multi-unit locomotive and cars connected thereto, atmospheric air will flow from the point of rupture of the train vacuum brake pipe to the chamber 139 in the vacuum control valve device 13 on the leading unit A via the train brake pipe on the cars remaining connected to the multi-unit locomotive, vacuum brake pipe 10 extending from end to end of the multi-unit locomotive, pipe 316 on leading unit A, pipe T 315, pipe 314, filter device 313, pipe 312, chambers 175 and 176 in the vacuum brake release valve device 16 (since valve 172 is always unseated on the leading unit A), pipe 311, side outlet of pipe T 317, and pipe and passageway 318 until the pressure in the chamber 139 is increased to atmospheric pressure.

This increase in pressure in the chamber 139 to atmospheric pressure is effective in combination with the fluid pressure present in the chamber 117 to deflect the diaphragm stack downward until the spring seat 157 contacts the upper end of hollow spool-type valve 148 after which further downward deflection of the diaphragm stack moves the valve 148 downward until the collar 150 thereon contacts the plug 153. Subsequent to the collar 150 contacting plug 153, the spring 159 is compressed until the diaphragm stack moves the plate 142 downward into contact with a stop 427 formed on the sectionalized casing of the vacuum control valve device 13.

It may be noted that, prior to a break-in-two of the train, the chamber 70 below the diaphragm 67 in the break-in-two protection valve device 19 on the leading locomotive unit A is open to atmosphere via passageway 71, pipe 293, pipe T 292, pipe 291, double check valve device 286, pipe 285, pipe T 284, pipe 283, passageway 228, chamber 227 and passageway 229 in the differential pilot valve device 18 on leading unit A, pipe and passageway 304, peripheral annular groove 149 on hollow spool-type valve 148 in the vacuum control valve device 13 on the leading unit A, passageway 154, and choke 305 so that air at atmospheric pressure is trapped in the chamber 70 upon downward movement of the spool-type valve 148 to the position in which the collar 150 abuts the plug 153 as the result of atmospheric air flowing through the parted or ruptured train vacuum brake pipe and vacuum brake pipe 10 to the chamber 139 in the vacuum control valve device 13.

While the spool-type valve 148 occupies the position in which the collar 150 thereon abuts the plug 153, the upper O-ring 151 on the spool-type valve 148 is disposed below the opening of the passageway 155 at the wall surface of the bore 146. Therefore, the fluid present in the chamber 145 which, as hereinbefore stated, may be, for example, at a pressure of twenty-five pounds per square inch, flows therefrom via the passageway 155, and a pipe 428 having therein a choke 429 to one end of a pipe T 430, the opposite end of which is open to atmosphere via a choke 431 the size of which is less than the size of the choke 429. The side outlet of the pipe T 430 is connected by a pipe 432 to one end of a volume reservoir 433, the opposite end of which is connected by a pipe and passageway 434 to the chamber 69 above the diaphragm 67 of the break-in-two protection valve device 19 on the leading unit A. Consequently, upon the occurrence of a break-in-two of the train, fluid under pressure flows from the chamber 145 in the vacuum control valve device 13 to the chamber 69 of the break-in-two protection valve 19 on the leading unit A whereupon the pressure in this chamber 69 is increased at a rate controlled by the size of the chokes 429 and 431 and the volume of reservoir 433.

If the location of the break-in-two of the train is near the multi-unit locomotive, atmospheric air flows via the train vacuum brake pipe on the cars still connected to the locomotive, the vacuum brake pipe 10 on each locomotive unit, side outlet of the pipe T 319 on the leading unit A (FIG. 2A), pipe 320, combined cut-out cock and strainer device 9, pipe and passageway 321, cut-out valve device 8, pipe and passageway 323, pipe T 324, pipe 334, pipe T 335, pipe 338, pipe T 339, pipe 340, branch passageway 64a and passageway 64 to the chamber 55 in the brake control valve device 7 on the leading unit A to increase the pressure in chamber 55 to full atmospheric pressure whereupon the brake control valve device 7 on the leading unit A operates in the manner hereinbefore described to supply fluid under pressure to the corresponding relay valve device 342. This relay valve device 342 operates in response to the fluid under pressure supplied thereto to effect the supply of fluid under pressure to the corresponding brake cylinder device 2 to cause a full service application of the brakes on the leading unit A and to the brake cylinder equalizing pipe 397 to cause a full service application of brakes on the trailing units B and C in the manner hereinbefore described.

It should be remembered that the brake control valve devices 7 on the respective trailing units operate at this time but are cut off from the corresponding relay valve device 342 by the selector valve device 341 on the respective trailing unit. Therefore, operation of the relay valve device 342 on the leading unit A controls the brakes on all three units.

If, however, the location of the break-in-two of the train is remote from the multi-unit locomotive, the reduction in the degree of vacuum in the chamber 55 of the brake control valve device 7 on the leading unit A is small. Consequently, a brake application less than a full service brake application is correspondingly effected on each unit.

Therefore, to insure a full service brake application on each unit of the multi-unit locomotive, the fluid under pressure supplied to the chamber 69 in the break-in-two protection valve device 19 on the leading locomotive unit A in the manner hereinbefore explained will increase the pressure in this chamber 69 at a rate determined by the chokes 429 and 431 and the size of reservoir 433 as previously explained, and when the pressure in the chamber 69 is increased sufficiently to deflect the diaphragm 67 downward against the yielding resistance of the spring 73 to, through the intermediary of the stem 75 and forked connection 78, first seat the valve 77 on its corresponding valve seat 79 and then move the valve 86 downward away from its corresponding seat 87. The chamber 88 is connected by a passageway and pipe 435 to the side outlet of a pipe T 436 that is disposed in the main reservoir equalizing pipe 353 which, as hereinbefore mentioned, on each unit is charged from the corresponding first main reservoir 3 via choke 357 (FIG. 2A). Therefore, fluid under pressure will now flow from the chamber 88 to the chamber 83 and thence via a passageway and pipe 437 to the side outlet of a pipe T 438 one end of which is connected to the whistle 20 by a pipe 439 and the opposite end of which is connected by a pipe 440 to a piston chamber in the emergency relay valve device 21.

Fluid under pressure thus supplied to the whistle 20 will sound an alarm to notify the engineer that an emergency brake application is about to occur, and the fluid under pressure thus supplied to the relay valve device 21 operates this device to effect a reduction in pressure in the fluid pressure brake pipe 1 at an emergency rate until the pressure therein is reduced to atmospheric pressure.

This reduction in pressure in the fluid pressure brake pipe 1 on the leading unit A to atmospheric pressure effects a corresponding reduction in pressure in the chamber 69 of the corresponding cut-out valve device 8 to atmospheric pressure. Therefore, the cut-out valve device 8 on the leading unit A operates in response to the reduction in the pressure in the corresponding chamber 69 to supply fluid under pressure from the corresponding second main reservoir 4 to the chamber 55 in the corresponding brake control valve device 7 to cause the operation thereof in the manner hereinbefore described in detail to supply fluid under pressure to the chamber 380 of the relay valve device 342 on the leading unit A. The relay valve device 342 on the leading unit A then operates in the manner hereinbefore described to supply fluid under pressure to the corresponding brake cylinder device 2 to effect a brake application on the leading unit A and to the brake cylinder equalizing pipe 397 in accordance with the setting of the reducing valve device 398 on unit A to effect a corresponding brake application on the trailing units B and C in the manner hereinbefore described in detail.

(b) Partial suppression of a brake application on locomotive subsequent to break-in-two of train When a break-in-two of a train occurs and it is desired to partly suppress a brake application on the multi-unit locomotive, and insofar as possible on the cars still connected to the locomotive, the engineer must promptly, prior to the sounding of the whistle 20 and before too much atmospheric air is admitted to the vacuum brake pipe 10, manually depress the push button 255 of the valve device 426 (FIG. 2C) to move the hollow plunger 253 of this valve device downward to effect unseating of flat disc valve 260 from annular valve seat 261. The chamber 263 in the valve device 426 is connected by a pipe 441 to the side outlet of a pipe T442 disposed in the fluid pressure brake pipe 1, and the chamber 249 is connected by a pipe 441a to the inlet connection of a one-way flow check valve device 443 the outlet of which is connected by a pipe 444 to the left-hand side of the hereinbefore-mentioned double check valve device 286. Therefore, while the flat disc valve 260 is unseated, fluid under pressure will flow from the fluid pressure brake pipe 1 to the chamber 70 below the diaphragm 67 of the break-in-two protection valve device 19 on the leading unit A via the side outlet of pipe T442, pipe 441, chambers 263 and 249 in the valve device 426, pipe 441a, check valve device 443 and pipe 444 to the left-hand end of the double check valve device 286 to move the check valve therein to its right-hand position if it is not already in this position, thence via the pipe 291 connected to the side outlet thereof, pipe T 292, pipe 293 and passageway 71. This supply of fluid under pressure to the chamber 70 below diaphragm 67 of the break-in-two protection valve device 19 on the leading unit A prevents operation of this valve device 19 upon the supply of fluid under pressure to the chamber 69 above the diaphragm 67 by operation of the vacuum control valve device 13 in response to break-in-two of the train as has been hereinbefore explained in detail. Consequently, the whistle 20 is not sounded and the emergency relay valve device 21 is not operated to vent fluid under pressure from the fluid pressure brake pipe 1 at an emergency rate to cause an application of the brakes on the multi-unit locomotive.

Fluid under pressure supplied from the fluid pressure brake pipe 1 to the pipe T 292 (FIG. 2C) by manual operation of the valve device 426 as previously explained also flows to the chamber 297 in the quick release valve device 14 on the leading unit A via pipe 294, timing volume reservoir 295 and pipe 296. Therefore, when the pressure in timing volume reservoir 295 and chamber 297 has been increased to a value sufficient to overcome the biasing force of the spring 161, the piston 168, acting through the intermediary of the piston rod 169, will move the disc valve 160 upward from its annular valve seat 162 against the yielding resistance of the spring 161 to establish a large capacity communication between the chambers 163 and 164 in the quick release valve device 14 on the leading unit A.

Since the disc-shaped valve 172 of the vacuum brake release valve device 16 (FIG. 2D) on the leading unit A is now unseated, the vacuum control valve device 13 (FIG. 2C) on unit A has been operated to establish a communication between pipe 311 and pipe 15 in response to rupture of the train vacuum brake pipe, and the disc-shaped valve 160 of the quick release valve 14 (FIG. 2C) on leading unit A is now unseated, the vacuum reservoir 5 on unit A is connected to the corresponding vacuum brake pipe 10. Therefore, the exhauster on leading unit A, which is connected to vacuum reservoir 5 via pipe 166, will operate to evacuate atmospheric air admitted to the train vacuum brake pipe at the location of the pull-apart of the train. The capacity of the exhauster on leading unit A is not great enough to evacuate from the train vacuum brake pipe all of the atmospheric air being admitted thereto at the location of the rupture. However, by thus evacuating some of the atmospheric air admitted to the train vacuum brake pipe, the pressure rise in the chamber 55 in the brake control valve device 7 on the leading unit A will not be at a rate as rapid as would be the case if the exhauster on the leading unit A were not evacuating from the train vacuum brake pipe a part of the atmospheric air being admitted thereto at the location of the break-in-two of the train. By thus slowing down the rate of rise of pressure in the chamber 55 of the brake control valve device 7 on the leading unit A, the application of the brakes on the three units A, B and C is correspondingly somewhat delayed and made more gradual. This enables the engineer, by proper operation of the throttle, to move the locomotive forward thereby lessening the tendency of the remaining cars connected to the locomotive to close the slack therebetween and then run into the locomotive, it being remembered that the fluid pressure brake on the locomotive provides a much greater braking force thereon than the braking force provided on the cars by the vacuum type brake equipment thereon.

(c) Break-in-two of two adjacent locomotive units

Let it be supposed that a break-in-two occurs between the trailing units B and C, which break-in-two of course ruptures the hose connections between trailing units B and C of (1) the fluid pressure brake pipe 1, (2) main reservoir equalizing pipe 353, (3) brake cylinder equalizing pipe 397, and (4) vacuum brake pipe 10.

Fluid under pressure is released from the main reservoir equalizing pipe 353 to atmosphere upon a break-in-two between units B and C at a rate faster than fluid under pressure can be supplied to the main reservoir equalizing pipe 353 from the second main reservoir 3 on the respective units A, B and C via the corresponding chokes 357 (FIG. 2A). Therefore, fluid under pressure is released from the upper end of the bore 344 in each respective selector valve device 341 to atmosphere via the corresponding passageway and pipe 351, pipe T 352 and the point of rupture of the main reservoir equalizing pipe 353. Consequently, the spring-biased spool-type valve 347 in the selector valve device 341 on each respective locomotive unit will be returned to the position shown in FIG. 2B.

(1) APPLICATION OF BRAKES ON LEADING UNIT A

At the time of the break-in-two between trailing units B and C, the spool-type valve 348 in the selector valve device 341 on the leading unit A occupies the position shown in FIG. 2B in which the peripheral annular groove 392 thereon establishes a communication between pipe and passageway 391 and the passageway 393. Therefore, when the spool-type valve 347 is returned to the position shown in FIG. 2B, the peripheral annular groove 394 thereon closes communication between passageway 393 and passageway and pipe 395 which is connected to the side outlet of the pipe T 396 disposed in the brake cylinder equalizing pipe 397. Accordingly, operation of the relay valve device 342 on the leading unit A will now be effective to supply fluid under pressure only to the corresponding brake cylinder device 2.

Upon occurrence of the break-in-two between trailing units B and C, fluid under pressure is vented at an emergency rate from the chamber 69 of the cut-out valve device 8 on leading unit A to atmosphere via pipe and passageway 325, pipe T 326, pipe 24, passageway 192, peripheral annular groove 205 on spool-type selector valve 194 in manual change-over valve 17 on the leading unit A, passageway 193, pipe and passageway 271, peripheral annular groove 272 on application valve 101 of brake application valve device 11 (FIG. 2), passageway and pipe 273, pipe T 274, pipe 275, pipe T 276 and the point of rupture of the fluid pressure brake pipe 1. Therefore, the cutout valve device 8 on the leading unit A will operate in the manner hereinbefore described to effect the supply of fluid under pressure from the corresponding second main reservoir 4 to the chamber 55 in the brake control valve device 7 on the leading unit A and to the dynamic cut-out switch device 333 to open the hereinbefore-mentioned circuit and effect deenergization of the electrically operated valve device 371 so that it is moved by fluid under pressure to the position shown in FIG. 2B.

This brake control valve device 7 now operates in the manner hereinbefore described to supply fluid under pressure from the reducing valve 398 on the leading unit A to the corresponding relay valve device 342 via the electrically operated valve device 371 and the selector valve device 341 on leading unit A. The relay valve device 342 operates in response to the fluid under pressure thus supplied thereto to effect a full service brake application on only the leading unit A since this relay valve device has been cut off from the brake cylinder equalizing pipe 397 as hereinbefore explained.

(2) APPLICATION OF BRAKES ON TRAILING UNITS

Prior to a break-in-two, the spool-type valves 346, 347 and 348 of the selector valve device 341 on each respective trailing unit are all in their lower position as has hereinbefore been explained.

At the time of the break-in-two, the spring-biased spool-type valve 347 will be returned to the position in which it is shown in FIG. 2B as a result of rupture of the main reservoir equalizing pipe 353, as has been explained in detail. Upon the return of the spool-type valve 347 to the position shown in FIG. 2B, the fluid under pressure previously supplied to the upper end of the bore 343 in the selector valve device 341 on the respective trailing unit in the manner hereinbefore described will be vented to atmosphere via passageway 350, a port 445 in the spool-type valve 347 and a port 446 in the bottom of the casing of the selector valve device 341. Upon release of fluid under pressure from the upper end of the bore 343, the spring-biased spool-type valve 346 will return to the position in which it is shown in FIG. 2B since the vacuum present in the pipe and passageway 349 that opens into the bottom of the bore 343 is destroyed as a result of the break-in-two between units B and C.

Upon return of the spool-type valve 346 in the selector valve device 341 on the respective trailing unit to the position shown in FIG. 2B, the peripheral annular groove 368 thereon establishes a communication between pipe and passageway 369 and pipe and passageway 370 to provide for an application of brakes on the respective trailing unit in a manner now to be described.

On each trailing unit, the spool-type selector valve 194 of the manual change-over valve device 17 thereon is in a position to close communication passageways 192 and 193. Therefore, the chamber 69 in the cut-out valve device 8 on the respective trailing unit is cut off from the fluid pressure brake pipe 1. Consequently, the cut-out valve device 8 on the respective trailing unit is not operated to supply fluid under pressure from the second main reservoir 4 on the respective trailing unit to the corresponding brake control valve device 7 when a break-in-two occurs between the trailing units B and C. However, atmospheric air admitted to the vacuum brake pipe 10 at the location of the break-in-two flows from the vacuum brake pipe 10 on the respective trailing unit to the chamber 55 in the corresponding brake control valve device 7 via pipe 320, the combined cut-out cock and strainer device 9, pipe and passageway 321, the cut-out valve device 8 on the respective trailing unit, passageway and pipe 323, pipe T 324, pipe 334, pipe T 335, pipe 338, pipe T 339, pipe 340, passageway 64a, and passageway 64. This supply of atmospheric air to the chamber 55 is effective to operate the control valve device 7 on the respective trailing unit to effect the supply of fluid under pressure from the corresponding reducing valve device 398 to the relay valve device 342 on the respective trailing unit via the peripheral annular groove 368 on the spool-type valve 346 of the selector valve device 341 on the respective trailing unit since, at the time of break-in-two, the spool-type valve 346 is moved to the position shown in FIG. 2B as hereinbefore explained.

Fluid under pressure thus supplied to the relay valve device 342 on the respective trailing unit operates this relay valve device to effect the supply of fluid under pressure to the corresponding brake cylinder device 2 to apply the brakes on the respective trailing unit.

It may be noted that the reducing valve device 398 on the leading unit A may be set to provide a higher brake cylinder presure than that provided by the reducing valve device 398 on the trailing units B and C, or the reducing valve devices 398 on the three units may be set to provide the same brake cylinder pressure on the trailing units B and C as on the leading unit A.

If a break-in-two occurred between units A and B, the units A, B and C operate in the same manner as has been described for a break-in-two between units B and C.

SAFETY CONTROL FEATURE

If the engineer removes his foot from pedal 104 of the foot valve device 12 (FIG. 2), the spring 105 will move the spool-type valve 103 in the direction of the right hand to the position shown so that the passageway 108 will be connected to the passageway and pipe 111 via the chamber 109. Fluid under pressure will now flow from the chamber 243 above diaphragm 240 in brake application valve device 11 to atmosphere via passageway 242, branch passageways 242a and 242b, counterbore 269 in brake application valve device 11, passageway and pipe 270, passageway 108 in foot valve device 12, chamber 109, passageway and pipe 111, choke 113, pipe T 114, and choke 115. Fluid under pressure also flows from pipe T 114 to atmosphere via whistle 112 to sound an alarm. Since the timing volume reservoir 268 is connected to the branch passageway 242a via pipe 267, check valve device 266, and pipe and passageway 264, fluid under pressure in the timing volume 268 is also vented to atmosphere. Fluid under pressure thus vented from the chamber 243 above the diaphragm 240 and from the timing volume reservoir 268 to atmosphere is at a faster rate than fluid under pressure can be supplied thereto from the second main reservoir 4 via pipe 23, pipe cross 302, pipe and passageway 238, branch passageway 238a, choke 241 and passageway 242.

Since fluid under pressure is supplied from the pipe and passageway 238 to the chamber 239 below the diaphragm 240 at an unrestricted rate, a differential of pressure is established to deflect the diaphragm 240 upward and move the application valve 101 from the position shown in which the peripheral annular groove 272 thereon establishes a communication between pipe and passageway 271 and the pipe and passageway 273 to a brake application position in which the peripheral annular groove 272 establishes a communication between the pipe and passageway 273 and a passageway 447 that is open to atmosphere via a choke 448. Fluid under pressure will now flow from the fluid pressure brake pipe 1 to atmosphere via the side outlet of pipe T 276 (FIG. 2), pipe 275, side outlet of pipe T 274, pipe and passageway 273, peripheral annular groove 272 on application valve 101, the passageway 447 and the choke 448, the size of which is such as to provide for a reduction in the fluid pressure brake pipe 1 at a service rate. This reduction in the pressure in the fluid pressure brake pipe 1 at a service rate effects a service brake application on the multi-unit locomotive and cars in the train in the same manner as when the pressure in the fluid pressure brake pipe 1 is reduced at a service rate by operation of the engineer's brake valve device 6 on the leading locomotive unit A.

RELEASE OF A SAFETY CONTROL BRAKE APPLICATION

While the application valve 101 of the brake application valve device 11 (FIG. 2) occupies its upper or brake application position, fluid under pressure supplied from the second main reservoir 4 (FIG. 2A) via pipe 23, pipe cross 302, pipe and passageway 238, branch passageway 238a, choke 241, and passageway 242 to the chamber 243 above the diaphragm 240 can flow from the chamber 343 to atmosphere via passageway 242, branch passageways 242a and 242b, the lower end of bore 245, passageway and pipe 246, chamber 249 in manually operated on-off valve 247, ports 250 in bushing 251, and the hollow plunger 253.

Therefore, in order to release a safety control brake application, the engineer will depress the push button 255 of on-off valve device 247 to effect counterclockwise rocking of the pivoted lever 256 which is effective to move the hollow plunger 253 downward until the lower end thereof contacts the upper side of the flat disc valve 260 after which further downward movement of hollow plunger 253 moves this valve away from its corresponding annular seat 261 to establish a communication between chambers 249 and 263, the latter chamber being closed by a plug 449. Upon movement of the lower end of the plunger 253 into contact with the upper side of the flat disc valve 260, the chamber 249 is cut off from atmosphere to thereby prevent further flow of air from the chamber 243 in the brake application valve device 11 to atmosphere.

If now the engineer depresses the pedal 104 of the foot valve device 12 on the leading unit A to disconnect pipe and passageway 270 from atmosphere via the whistle 112 and choke 115, the fluid under pressure supplied via the choke 241 and passageway 242 to the chamber 243 above the diaphragm 240 will increase the pressure in the chamber 243 until the spring 244 is rendered effective to deflect the diaphrgam 240 downward and move the application valve 101 downward to the position in which it is shown in FIG. 2 to close communication between branch passageway 242b and pipe and passageway and pipe 246 whereupon the engineer can release push button 255 of on-off valve device 247. In this position of the application valve 101, the peripheral annular groove 272 thereon establishes a communication between the pipe and passageway 271 and the pipe and passageway 273 whereupon the fluid pressure brake pipe 1 is recharged to its normal charged value by the self-lapping unit of the engineer's brake valve device 6 on the leading unit A. Recharging of the fluid pressure brake pipe 1 effects a release of the brakes on the multi-unit locomotive and the cars in the train connected thereto in the manner hereinbefore described in connection with a brake release subsequent to a brake application.

Having now described the invention, what I claim as new and desire to secure by Letters Patent, is:

1. In a multiple unit locomotive vacuum brake control system comprising on each locomotive unit an exhauster respectively evacuating a corresponding storage reservoir, the combination of:

(a) a vacuum brake pipe extending through the several locomotive units, (b) a communication extending between each of the storage reservoirs and said vacuum brake pipe,

[(c) a fluid pressure operated valve means disposed in said communication for controlling evacuation of fluid under pressure from said vacuum brake pipe in response to evacuation of the corresponding reservoir by operation of the exhauster on the respective locomotive unit,]

(*c*)[(d)] a source of fluid under pressure, (*d*)[(e)] a fluid pressure brake pipe on each locomotive unit connected to a corresponding fluid pressure brake pipe on each adjacent locomotive unit, (*e*)[(f)] a manually operable engineer's brake valve device for controlling the supply of fluid under pressure from said source of fluid under pressure to said fluid pressure brake pipe to effect the charging thereof up to a chosen pressure and for controlling the release of fluid under pressure from said fluid pressure brake pipe to atmosphere to effect a reduction in the pressure therein, (f)[(g)] a plurality of fluid pressure operated valve means interposed in series respectively in said communication between each of the storage reservoirs and said vacuum brake pipe for controlling the rate of evacuation of fluid under pressure from said vacuum brake pipe in response to evacuation of the corresponding reservoir by operation of the exhauster on the respective locomotive unit, one of said plurality of fluid pressure operated valve means being operable in response to variations in the pressure in either said fluid pressure brake pipe or in said vacuum brake pipe, (g) [(h)] a fluid pressure operated break-in-two protection valve means on each locomotive unit operable under the control of the corresponding one of said one of said plurality of said fluid pressure operated valve means to vent fluid under pressure from said fluid pressure brake pipe to cause a brake application, (h) [(i)] a double check valve device on each locomotive unit, (i) [(j)] a manually operable means on each locomotive unit selectively operable to one position to effect the supply of fluid under pressure from said source of fluid under pressure to a second one of said plurality of fluid pressure operated valve means on the corresponding locomotive unit via one end of said double check valve device to effect the operation thereof to establish a communication from the storage reservoir on the respective locomotive unit to the vacuum brake pipe, and to another position to cut off said communication, and (j) [(k)] a fluid pressure operated control means operable so long as the pressure of fluid in said fluid pressure brake pipe is charging at a rate in excess of a certain rate to effect the supply of fluid under pressure from said fluid pressure brake pipe to a third one of said plurality of fluid pressure operated valve means and to said fluid pressure operated break-in-two protection valve means on the corresponding locomotive unit to render said fluid pressure operated break-in-two protection valve means on said corresponding locomotive unit inoperative by said one of said plurality of fluid pressure operated valve means, and via the other end of said double check valve device, to said second one of said plurality of fluid pressure operated valve means on said respective locomotive unit to effect the operation thereof.

2. A control valve system as claimed in claim 1, further characterized in that said fluid pressure operated break-in-two protection valve means comprises a movable abutment subject on one side to fluid under pressure supplied by said one of said plurality of fluid pressure operated valve means and on its opposite side to fluid under pressure supplied by said fluid pressure operated control means.

3. A control valve system as claimed in claim 1, further characterized in that said fluid pressure operated break-in-two protection valve means comprises:

(a) a movable abutment subject on one side to fluid under pressure supplied by said one of said plurality of fluid pressure operated valve means and on its opposite side to fluid under pressure supplied by said fluid pressure operated control means, and (b) valve means operatively controlled by movement of said movable abutment upon the supply of fluid under pressure to said one side thereof in the absence of fluid under pressure on its opposite side to effect venting of fluid under pressure from said fluid pressure brake pipe to cause a brake application.

4. A control system as claimed in claim 1, further characterized in that said fluid pressure operated break-in-two protection valve means comprises two fluid pressure operated valve devices, one of which valve devices is operated upon the supply of fluid under pressure thereto by said one of said plurality of fluid pressure operated valve means to effect the supply of fluid under pressure from said source of fluid under pressure on the respective locomotive unit to the other of said valve devices, said other valve device being operable by fluid under pressure supplied thereto by said one valve device to effect venting of fluid under pressure from said fluid pressure brake pipe to cause a brake application.

5. A control system as claimed in claim 1, further characterized in that said one of said plurality of fluid pressure operated valve means comprises a valve operable to a position to effect releasing to atmosphere of fluid under pressure supplied to said third one of said plurality of fluid pressure operated means and to said fluid pressure operated break-in-two protection valve means by said fluid pressure operated control means only upon evacuation of said vacuum brake pipe to a chosen degree.

6. A control system as claimed in claim 1, further characterized in that said one of said plurality of fluid pressure operated valve means is operable to effect the supply of fluid under pressure to said fluid pressure operated break-in-two protection valve means only upon the destruction of the vacuum in said vacuum brake pipe.

7. In a multiple unit locomotive vacuum brake control system comprising on each locomotive unit an exhauster respectively evacuating a corresponding storage reservoir on each locomotive unit, the combination of:

(a) a vacuum brake pipe extending from end to end of the respective locomotive unit and connected to a corresponding vacuum brake pipe on an adjacent locomotive unit, (b) a communication extending between each respective storage reservoir and said vacuum brake pipe, (c) a plurality of fluid pressure operated valve means interposed in series in each of said communications for controlling the evacuation of fluid under pressure from said vacuum brake pipe in response to evacuation of the corresponding reservoir by operation of the exhauster on the respective locomotive unit, (d) a source of fluid under pressure, (e) a fluid pressure brake pipe extending from end to end of the respective locomotive units and connected to a corresponding fluid pressure brake pipe on an adjacent locomotive unit, (f) a double check valve device, (g) a manually operable means selectively operable at one time when the respective locomotive unit is a leading unit to a first position to effect the supply of a fluid under pressure from said source of fluid under pressure via one end of said double check valve device to one of said plurality of fluid pressure operated valve means to cause the operation thereof to open the corresponding communication, and operable, at another time when the respective locomotive unit is a trailing unit, to a second position to cut off the supply of fluid under pressure from said source of fluid under pressure to said one of said plurality of fluid pressure operated valve means and to connect said one end of said double check valve device to atmosphere, and (h) a fluid pressure operated valve device including means for causing it to operate so long as the pressure of fluid supplied to said fluid pressure brake pipe is increasing at a certain chosen rate, said fluid pressure operated valve device being operable, at both said one time and said another time, to effect the supply of fluid under pressure from said fluid pressure brake pipe to a second one of said plurality of fluid pressure operated valve means, said fluid pressure operated valve device being also operable at said another time when the respective locomotive unit is a trailing unit, to effect the supply of fluid under pressure from said fluid pressure brake pipe via the other end of said double check valve device to said one of said plurality of fluid pressure operated valve means to cause the operation thereof thereby to insure that said one and said second one of said plurality of fluid pressure operated valve means that are interposed in series in said communication are both operated to open the corresponding communication to effect the evacuation of fluid under pressure from said vacuum brake pipe so long as the pressure of fluid supplied to said fluid pressure brake pipe is increasing at said certain chosen rate regardless of whether the respective locomotive unit is a leading unit or a trailing unit.

8. In a multiple unit locomotive vacuum brake control system of the type having on each locomotive unit an exhauster for evacuating a corresponding storage reservoir, the combination on each one of the locomotive units of:

(a) a storage reservoir evacuated to a subatmospheric pressure by the corresponding exhauster, (b) a fluid pressure brake pipe normally charged to a certain super-atmospheric pressure, (c) a vacuum brake pipe normally evacuated to a certain subatmospheric pressure, (d) a communication extending between the storage reservoir on the unit and said vacuum brake pipe, (e) a first fluid pressure operated valve means disposed in said communication adjacent said storage reservoir and having an open and a closed position for controlling evacuation of fluid under pressure from said vacuum brake pipe through said communication, (f) a second fluid pressure operated valve means disposed in said communication on the side of said first fliud pressure operated valve means opposite the storage reservoir, for controlling the degree of subatmospheric pressure in the vacuum brake pipe, said second fluid pressure operated valve means being controlled according to the relation of the pressures in said fluid pressure brake pipe and said vacuum brake pipe to at one time cut off said storage reservoir from the vacuum brake pipe and to connect vacuum brake pipe to atmosphere and at another time open the said communication therethrough to the storage reservoir, (g) a third fluid pressure operated valve means disposed in said communication between said second fluid pressure operated valve means and said vacuum brake pipe and having an open and a closed position for controlling evacuation of fluid under pressure from said vacuum brake pipe through said communication, (h) a source of fluid under pressure on the unit, (i) a two-position manually operable change-over valve device operable to one position when the unit is the lead unit in multiple unit operation to effect the constant supply of fluid under pressure from said source of fluid under pressure to said third fluid pressure operated valve means to maintain it in its open position, said change-over valve device being manually operable to the other of its two positions when the unit is a trailing unit in multiple unit operation to establish a communication between said third fluid pressure operated valve means and atmosphere to cause said third fluid pressure operated valve means to move to its closed position to cut off evacuation of said vacuum brake pipe through the said communication on the corresponding unit, and (j) a fluid pressure operated valve device operable only so long as the pressure in said fluid pressure brake pipe is increasing to effect the supply of fluid under pressure from said fluid pressure brake pipe to said first and said third fluid pressure operated valve means to cause the operation thereof to their open position whereby said first, said second and said third fluid pressure operated valve means operate concurrently to open said communication, notwithstanding said two-position manually operable change-over valve device on a trailing unit being in its said other position, to enable the exhauster on a trailing unit to assist the exhauster on a leading unit in evacuating said vacuum brake pipe until said fluid pressure brake pipe is substantially completely charged to the normally charged pressure carried therein.

9. A control system, as claimed in claim 8, further characterized by a double check valve device operable to one position to establish a communication between said two-position manually operable change-over valve device and said third fluid pressure operated valve means and operable to another position to establish a communication between said fluid pressure operated valve device and said third fluid pressure operated valve means.

References Cited by the Examiner

The following references, cited by the Examiner, are of record in the patented file of this patent or the original patent.

UNITED STATES PATENTS 2,822,220 2/1958 May ---------- 303—4

EUGENE G. BOTZ, *Primary Examiner.*